United States Patent [19]

Moore-McKee et al.

[11] Patent Number: 5,724,242
[45] Date of Patent: Mar. 3, 1998

[54] METHOD FOR PRODUCING PRODUCTION CONTROL SOFTWARE FOR A NATURAL GAS ENGINE CONTROLLER

[75] Inventors: Amy L. Moore-McKee, Varna; Geoffrey D. Ginzel; William Schubert, both of Peoria, all of Ill.; Kevin S. King, West Lafayette, Ind.

[73] Assignee: Caterpillar Inc., Peoria, Ill.

[21] Appl. No.: 408,759

[22] Filed: Mar. 21, 1995

[51] Int. Cl.⁶ .............................. G06G 7/70; F02M 51/00
[52] U.S. Cl. ........................ 364/431.04; 364/431.11; 364/431.12; 364/424.04; 395/701; 395/712; 395/919; 395/922; 123/27 GE; 123/480; 123/486; 123/526
[58] Field of Search ................ 395/700, 800, 395/375, 905, 911, 919, 922, 703, 887, 701, 712, 10, 23; 364/424.01, 424.04, 431.01, 431.03, 431.04, 431.11, 431.12, 551.01, 423.098, 424.045, 431.051, 431.052, 431.053, 431.054, 431.055; 123/480, 486, 569, 571, 676, 526, 527, 321, 27 GE, 458, 577, 578

[56] References Cited

U.S. PATENT DOCUMENTS

| | | | |
|---|---|---|---|
| 4,125,101 | 11/1978 | Garcia et al. | 123/139 |
| 4,291,383 | 9/1981 | Tedeschi et al. | 364/551 |
| 4,841,441 | 6/1989 | Nixon et al. | 395/922 |
| 4,924,418 | 5/1990 | Bachman et al. | 395/424.04 |
| 4,996,643 | 2/1991 | Sakamoto et al. | 364/551.01 |
| 5,023,800 | 6/1991 | Carver et al. | 395/919 |
| 5,067,129 | 11/1991 | Evans et al. | 395/183.08 |
| 5,070,534 | 12/1991 | Lascelles et al. | 395/348 |
| 5,084,813 | 1/1992 | Ono | 395/1 |
| 5,119,479 | 6/1992 | Arai et al. | 395/887 |
| 5,142,469 | 8/1992 | Weisenborn | 395/922 |
| 5,212,645 | 5/1993 | Wildes et al. | 364/551.02 |
| 5,247,446 | 9/1993 | Motz et al. | 364/432.12 |
| 5,251,122 | 10/1993 | Sakamoto et al. | 364/147 |
| 5,255,197 | 10/1993 | Iida | 364/132 |
| 5,263,164 | 11/1993 | Kannady et al. | 395/922 |
| 5,270,918 | 12/1993 | Seki et al. | 364/191 |
| 5,278,759 | 1/1994 | Berra et al. | 364/424.01 |
| 5,284,116 | 2/1994 | Richeson, Jr. | 364/431.12 |
| 5,285,392 | 2/1994 | Kyle et al. | 364/133 |
| 5,295,222 | 3/1994 | Wadhwa et al. | 395/922 |
| 5,318,449 | 6/1994 | Schoell et al. | 364/431.04 |
| 5,370,097 | 12/1994 | Davis | 123/526 |
| 5,398,724 | 3/1995 | Vars et al. | 137/625.33 |
| 5,404,852 | 4/1995 | Fränkle | 123/321 |
| 5,491,631 | 2/1996 | Shirane et al. | 364/424.04 |
| 5,523,948 | 6/1996 | Adrian et al. | 364/431.12 |

*Primary Examiner*—Kevin J. Teska
*Assistant Examiner*—Jacques Louis-Jacques
*Attorney, Agent, or Firm*—James R. Yee; David M. Masterson

[57] ABSTRACT

A method of operating a computer to automatically produce production control software for a natural gas engine controller (104) on a machine is provided. The controller (104) is adapted to control a natural gas engine (106). The method includes the steps of (1) as a function of user input, defining a set of controller (104); and (2) producing control software to operate the controller (104) as defined by the specifications.

24 Claims, 34 Drawing Sheets

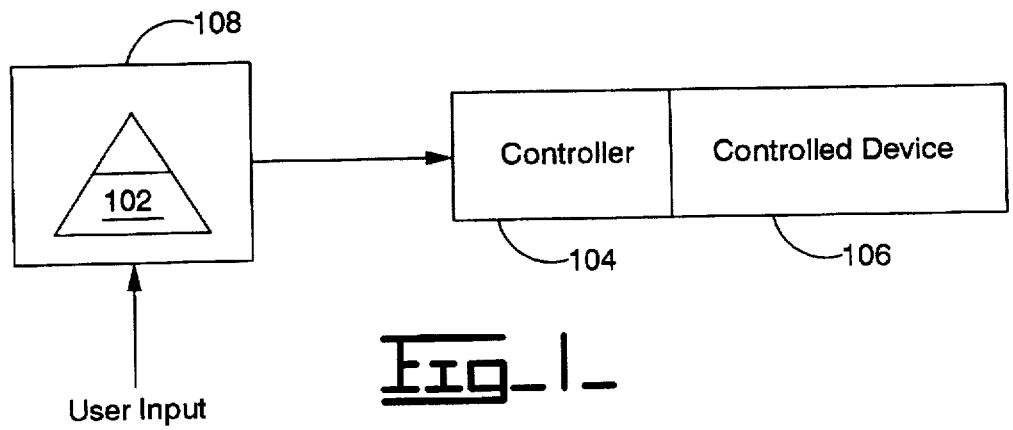

Fig_1_

| Air Features |
|---|
| air parameters, volumetric efficiency map, choke map, combustion probe map air/fuel map |
| Fuel Features |
| governor gains, feedback points, BTU settings, fuel factors, transient air/fuel map torque limit parameters, torque limit map, idle fuel map |
| Timing Features |
| timing retard map, base timing map |
| Engine Core Features |
| desired speed scaling, special scaling, pressure module, actuator type, ON/OFF features (electric starters, landfill module), AIRPER, FULPER, leaning out constant, initial fuel actuator movement gain, riching up constant, torque fuel filter |
| Protection Features |
| air temperature, air restriction, crankcase pressure, differential oil pressure, battery voltage, jacket water temperature, miscellaneous settings |

Fig_1B_

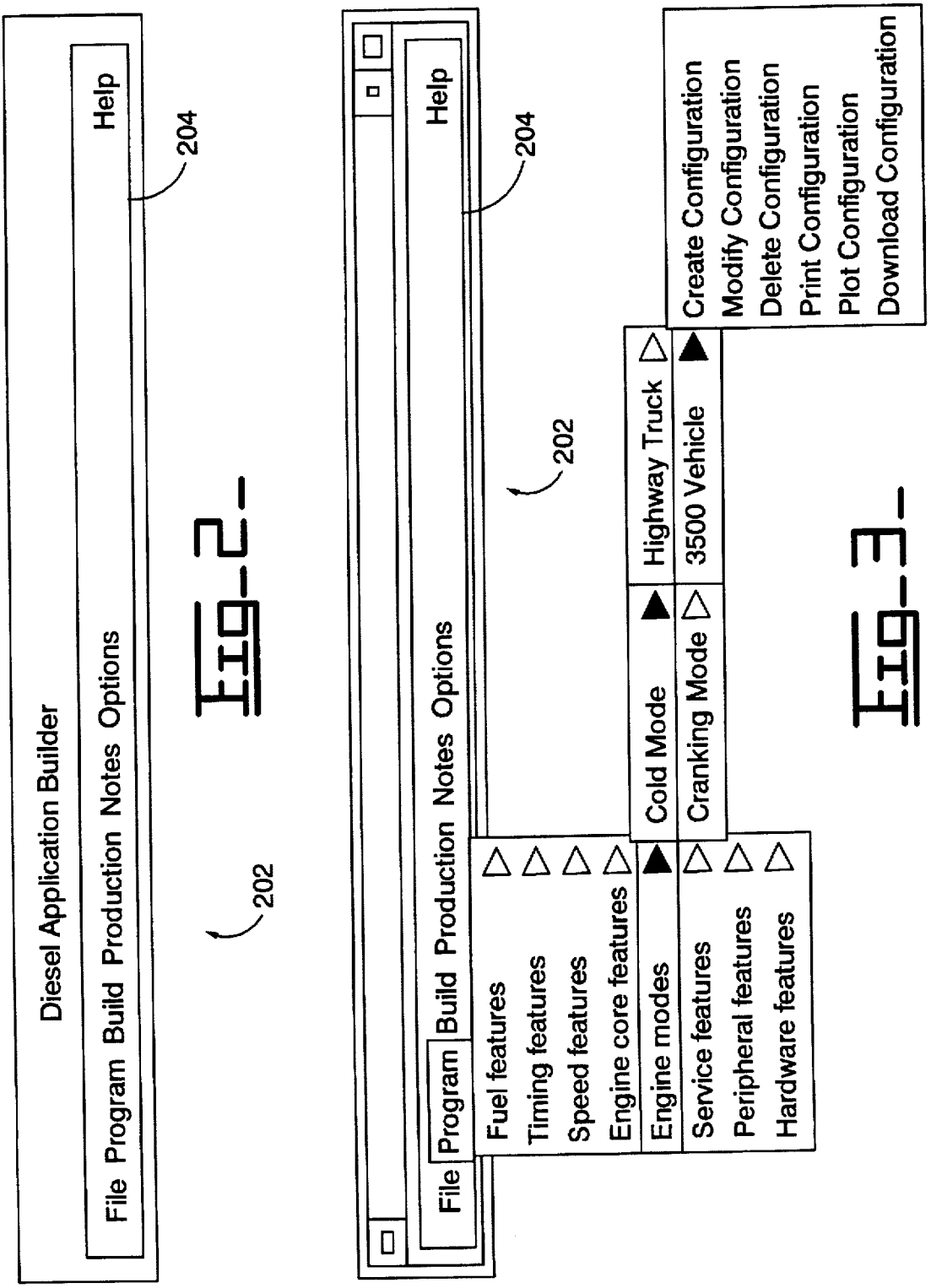

Fig_4_
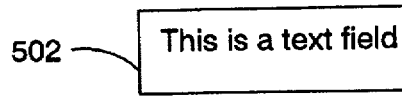
Fig_5_
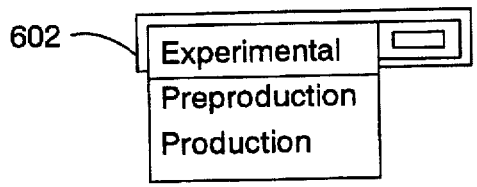
Fig_6_
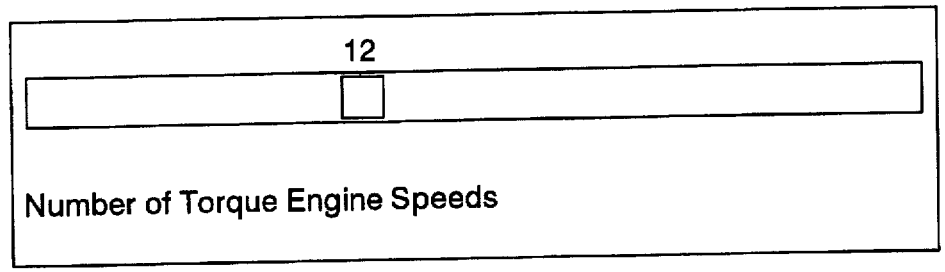
Fig_7_
Fig_8_
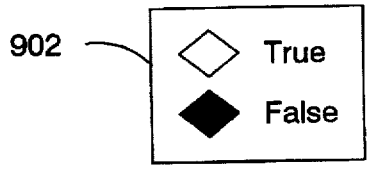
Fig_9_
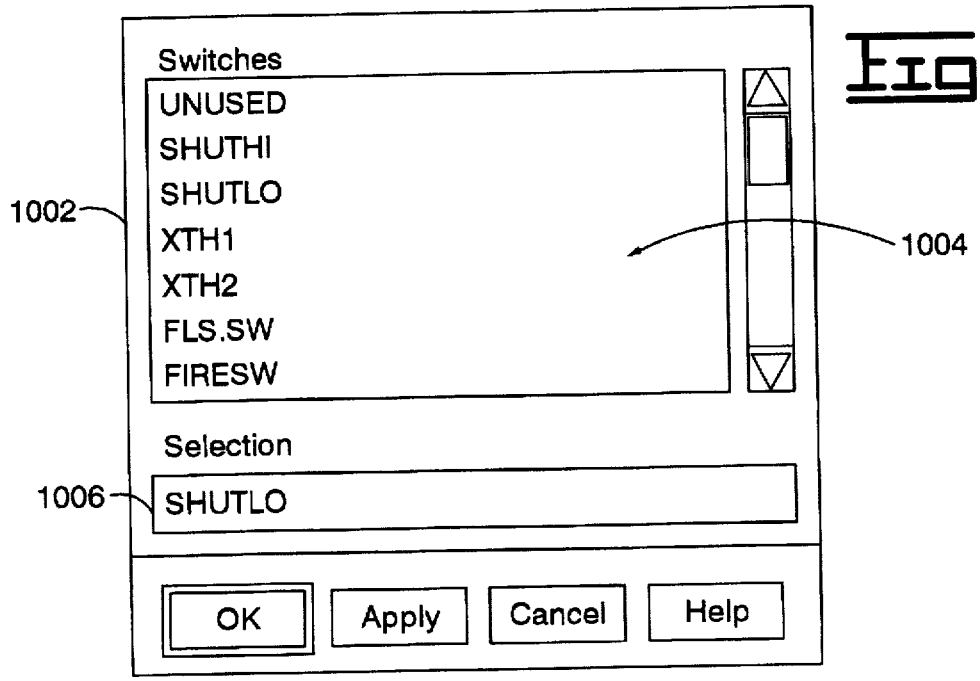
Fig_10_

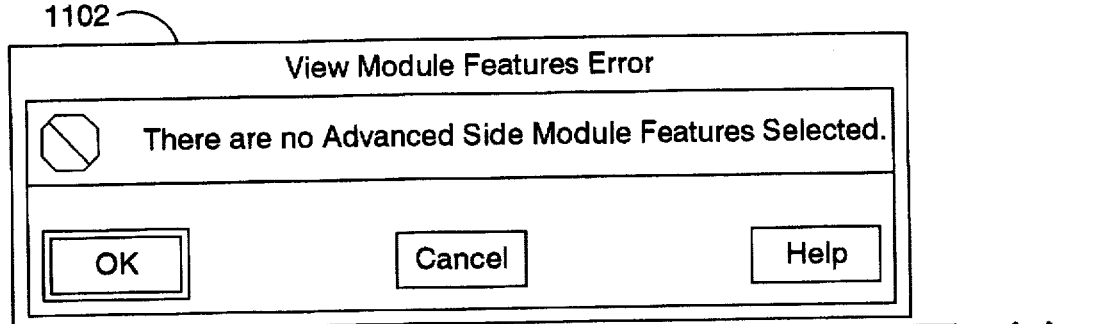
Fig_11_
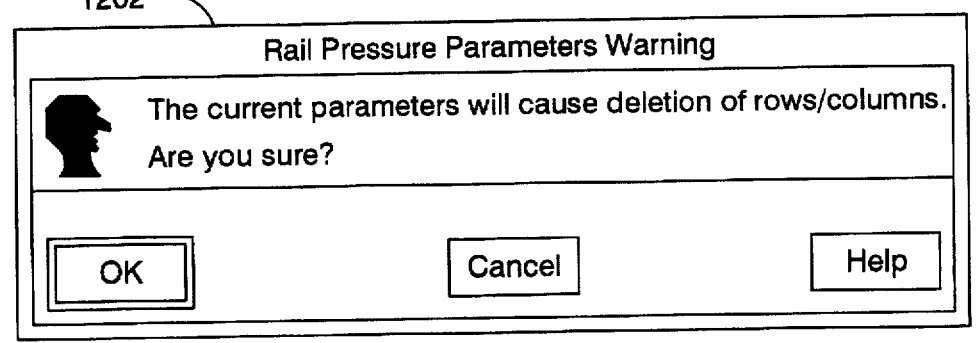
Fig_12_
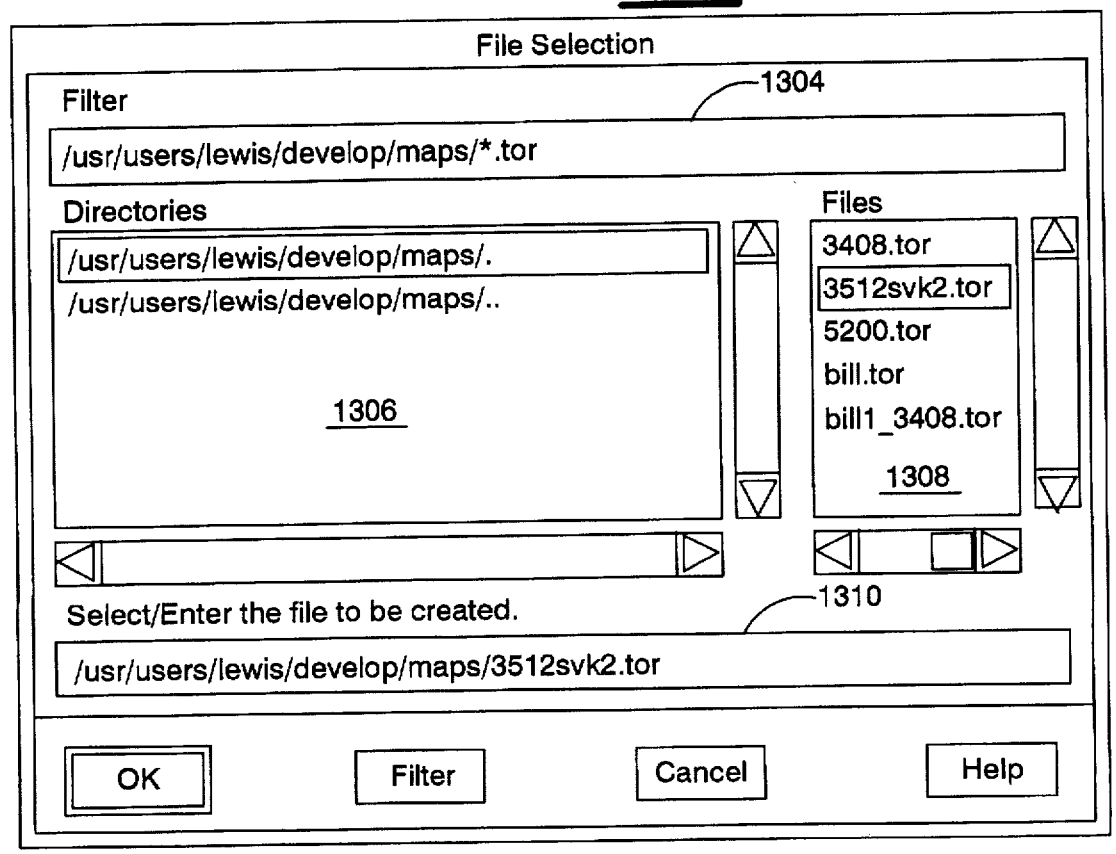
Fig_13_

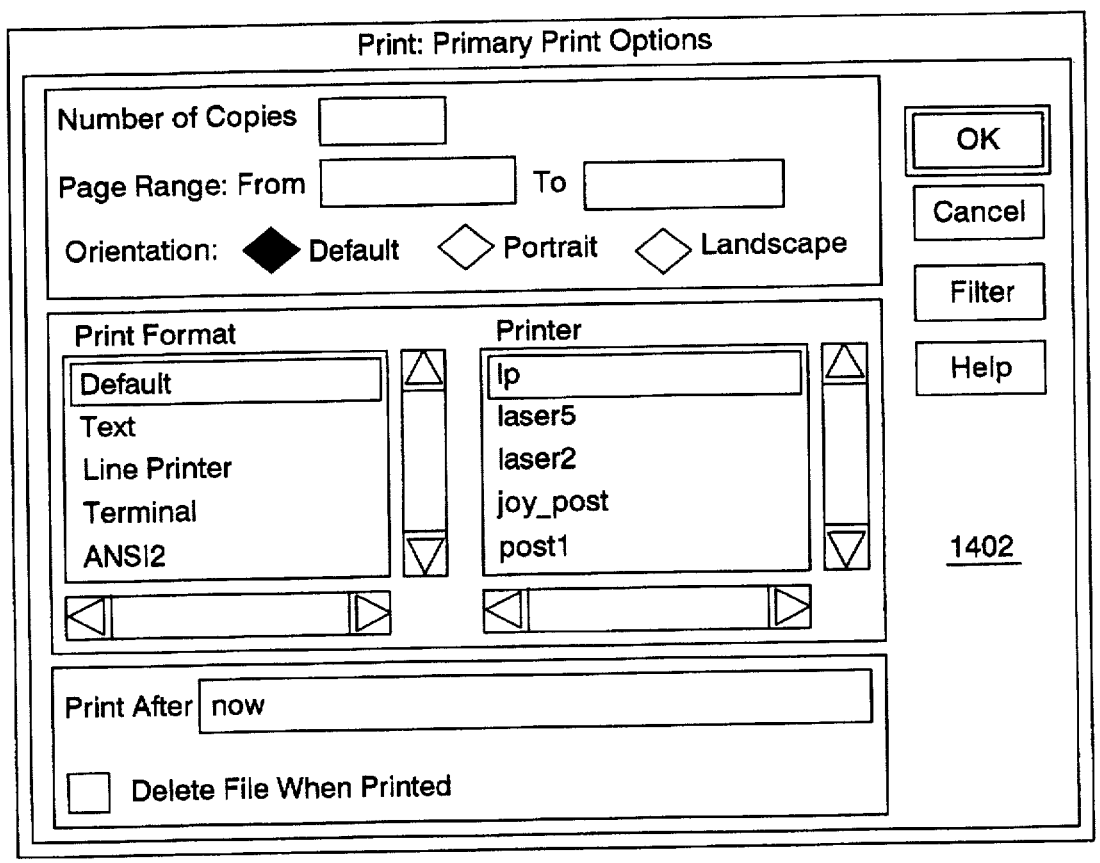
Fig_14_

Fig_15

Master Timing Map

Enter Value: in deg. BTDC  `10.00`

Rack Position (mm)

◆ Edit  ◇ Replace

| Engine Speed (rpm) | 0.000 | 1.000 | 2.000 | 3.000 | 4.000 | 5.000 | 6.000 | 7.000 | 8.000 | 9.000 | 10.000 | 11.000 |
|---|---|---|---|---|---|---|---|---|---|---|---|---|
| 700 | 10.00 | 10.00 | 10.00 | 10.00 | 10.00 | 10.00 | 10.00 | 10.00 | 10.00 | 10.00 | 10.00 | 10.00 |
| 750 | 10.00 | 10.00 | 10.00 | 10.00 | 10.00 | 10.00 | 10.00 | 10.00 | 10.00 | 10.00 | 10.00 | 10.00 |
| 800 | 12.00 | 12.00 | 12.00 | 12.00 | 12.00 | 12.00 | 12.00 | 12.00 | 12.00 | 12.00 | 12.00 | 12.00 |
| 850 | 15.00 | 15.00 | 15.00 | 15.00 | 15.00 | 15.00 | 15.00 | 15.00 | 15.00 | 15.00 | 15.00 | 15.00 |
| 900 | 17.00 | 17.00 | 17.00 | 17.00 | 17.00 | 17.00 | 17.00 | 17.00 | 17.00 | 17.00 | 17.00 | 17.00 |
| 950 | 18.00 | 18.00 | 18.00 | 18.00 | 18.00 | 18.00 | 18.00 | 18.00 | 18.00 | 18.00 | 18.00 | 18.00 |
| 1000 | 19.00 | 19.00 | 19.00 | 19.00 | 19.00 | 19.00 | 19.00 | 19.00 | 19.00 | 19.00 | 19.00 | 19.00 |
| 1050 | 20.00 | 20.00 | 20.00 | 20.00 | 20.00 | 20.00 | 20.00 | 20.00 | 20.00 | 20.00 | 20.00 | 20.00 |
| 1100 | 20.00 | 20.00 | 20.00 | 20.00 | 20.00 | 20.00 | 20.00 | 20.00 | 20.00 | 20.00 | 20.00 | 20.00 |
| 1150 | 20.00 | 20.00 | 20.00 | 20.00 | 20.00 | 20.00 | 20.00 | 20.00 | 20.00 | 20.00 | 20.00 | 20.00 |
| 1200 | 20.00 | 20.00 | 20.00 | 20.00 | 20.00 | 20.00 | 20.00 | 20.00 | 20.00 | 20.00 | 20.00 | 20.00 |
| 1250 | 20.00 | 20.00 | 20.00 | 20.00 | 20.00 | 20.00 | 20.00 | 20.00 | 20.00 | 20.00 | 20.00 | 20.00 |
| 1300 | 20.00 | 20.00 | 20.00 | 20.00 | 20.00 | 20.00 | 20.00 | 20.00 | 20.00 | 20.00 | 20.00 | 20.00 |
| 1350 | 20.00 | 20.00 | 20.00 | 20.00 | 20.00 | 20.00 | 20.00 | 20.00 | 20.00 | 20.00 | 20.00 | 20.00 |
| 1400 | 20.00 | 20.00 | 20.00 | 20.00 | 20.00 | 20.00 | 20.00 | 20.00 | 20.00 | 20.00 | 20.00 | 20.00 |
| 1450 | 20.00 | 20.00 | 20.00 | 20.00 | 20.00 | 20.00 | 20.00 | 20.00 | 20.00 | 20.00 | 20.00 | 20.00 |
| 1500 | 20.00 | 20.00 | 20.00 | 20.00 | 20.00 | 20.00 | 20.00 | 20.00 | 20.00 | 20.00 | 20.00 | 20.00 |
| 1550 | 20.00 | 20.00 | 20.00 | 20.00 | 20.00 | 20.00 | 20.00 | 20.00 | 20.00 | 20.00 | 20.00 | 20.00 |
| 1600 | 20.00 | 20.00 | 20.00 | 20.00 | 20.00 | 20.00 | 20.00 | 20.00 | 20.00 | 20.00 | 20.00 | 20.00 |
| 1650 | 20.00 | 20.00 | 20.00 | 20.00 | 20.00 | 20.00 | 20.00 | 20.00 | 20.00 | 20.00 | 20.00 | 20.00 |

1502

[ OK ]   [ Cancel ]   [ Help ]

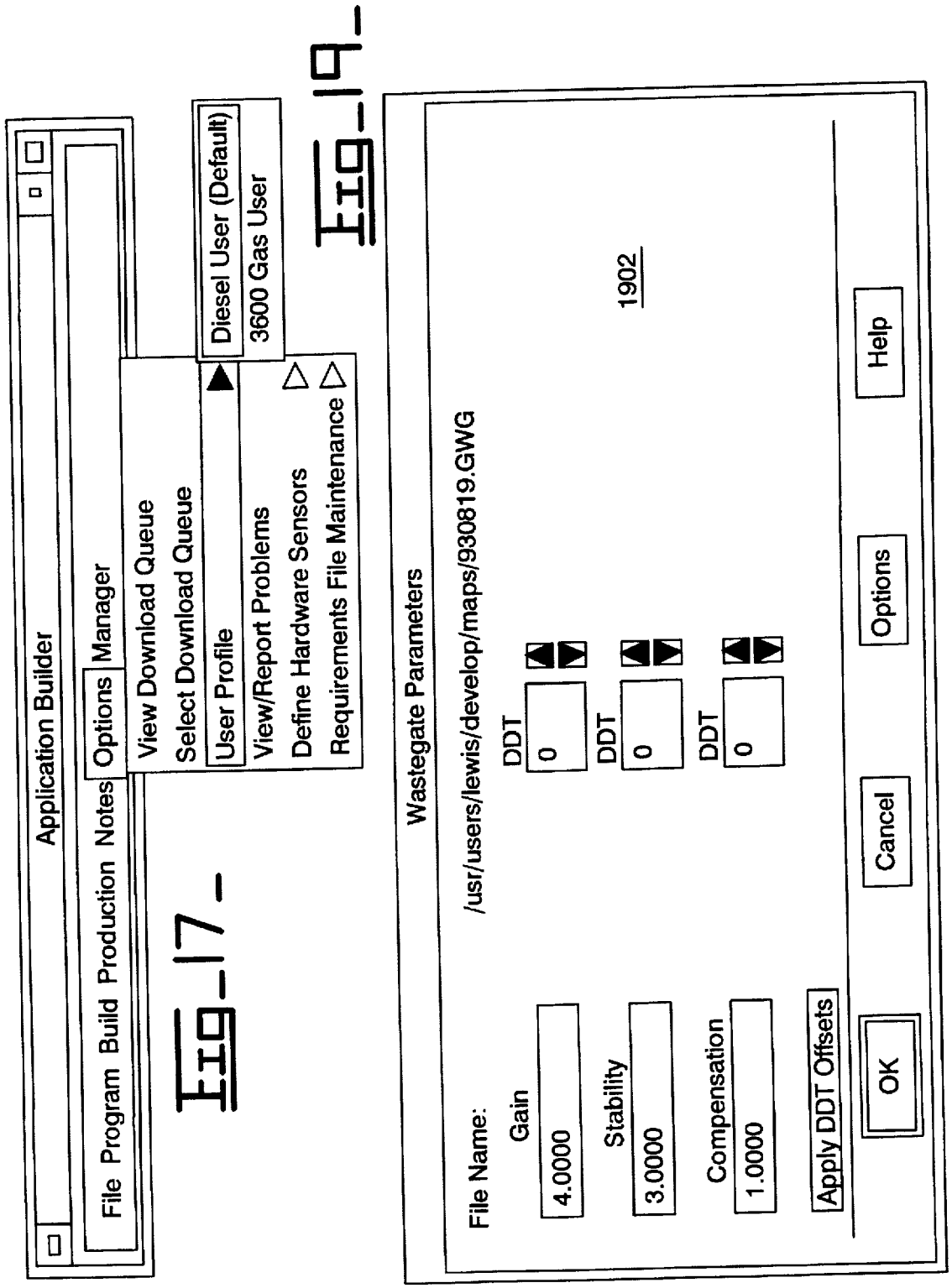
Fig_17_
Fig_19_

Fig. 20

Volumetric Efficiency Map

Enter Value: in bits  `1`

◆ Edit  ◇ Replace

2002

| Volumetric Efficiency (bits) | | |
|---|---|---|
| | 1 | |
| | 2 | |
| | 3 | |
| | 4 | |
| | 5 | |
| | 6 | |
| | 7 | |
| | 8 | |
| | 9 | |
| | 10 | |
| | 11 | |
| | 12 | |
| | 13 | |
| | 14 | |
| | 15 | |
| | 16 | |

Engine Speed (rpm): 0, 75, 150, 225, 300, 375, 450, 525, 600, 675, 750, 825, 900, 975, 1050, 1125

[OK]  [Cancel]  [Help]

Fig_21

Choke Map

Desired Air/Stroke (lbs/stk)

Enter Value: in bits

◆ Edit  ◇ Replace

| Engine Speed (rpm) | 0.0000 | 0.0053 | 0.0106 | 0.0159 | 0.0212 | 0.0265 | 0.0318 | 0.0371 | 0.0424 | 0.0477 | 0.0530 | 0.0583 | 0.0636 | 0.0689 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 75 | 0 | 0 | 0 | 0 | 0 | 0 | 0 | 0 | 0 | 0 | 0 | 0 | 0 | 0 |
| 150 | 0 | 0 | 0 | 0 | 0 | 0 | 0 | 0 | 0 | 0 | 0 | 0 | 0 | 0 |
| 225 | 0 | 0 | 0 | 0 | 0 | 0 | 0 | 0 | 0 | 0 | 0 | 0 | 0 | 0 |
| 300 | 0 | 0 | 0 | 0 | 0 | 0 | 0 | 0 | 0 | 0 | 0 | 0 | 0 | 0 |
| 375 | 0 | 0 | 0 | 0 | 0 | 0 | 0 | 0 | 0 | 0 | 0 | 0 | 0 | 0 |
| 450 | 0 | 0 | 0 | 0 | 0 | 0 | 0 | 0 | 0 | 0 | 0 | 0 | 0 | 0 |
| 525 | 0 | 0 | 0 | 0 | 0 | 0 | 0 | 0 | 0 | 0 | 0 | 0 | 0 | 0 |
| 600 | 0 | 0 | 0 | 0 | 0 | 0 | 0 | 0 | 0 | 0 | 0 | 0 | 0 | 0 |
| 675 | 0 | 0 | 0 | 0 | 0 | 0 | 0 | 0 | 0 | 0 | 0 | 0 | 0 | 0 |
| 750 | 0 | 0 | 0 | 0 | 0 | 0 | 0 | 0 | 0 | 0 | 0 | 0 | 0 | 0 |
| 825 | 0 | 0 | 0 | 0 | 0 | 0 | 0 | 0 | 0 | 0 | 0 | 0 | 0 | 0 |
| 900 | 0 | 0 | 0 | 0 | 0 | 0 | 0 | 0 | 0 | 0 | 0 | 0 | 0 | 0 |
| 975 | 0 | 0 | 0 | 0 | 0 | 0 | 0 | 0 | 0 | 0 | 0 | 0 | 0 | 0 |
| 1050 | 0 | 0 | 0 | 0 | 0 | 0 | 0 | 0 | 0 | 0 | 0 | 0 | 0 | 0 |
| 1125 | 0 | 0 | 0 | 0 | 0 | 0 | 0 | 0 | 0 | 0 | 0 | 0 | 0 | 0 |

2102

OK    Cancel    Help

Fig. 22

Combustion Probe Map

Enter Value: in msec  
Fuel/Stroke (lbs/stk): 2.0  
◆ Edit  ◇ Replace

| Engine Speed (rpm) | 0.00000 | 0.00022 | 0.00044 | 0.00066 | 0.00088 | 0.00110 | 0.00132 | 0.00154 | 0.00176 | 0.00198 | 0.00220 | 0.00242 |
|---|---|---|---|---|---|---|---|---|---|---|---|---|
| 350 | 2.0 | 2.0 | 2.0 | 2.0 | 2.0 | 2.0 | 2.0 | 2.0 | 2.0 | 2.0 | 2.0 | 2.0 |
| 400 | 2.0 | 2.0 | 2.0 | 2.0 | 2.0 | 2.0 | 2.0 | 2.0 | 2.0 | 2.0 | 2.0 | 2.0 |
| 450 | 2.0 | 2.0 | 2.0 | 2.0 | 2.0 | 2.0 | 2.0 | 2.0 | 2.0 | 2.0 | 2.0 | 2.0 |
| 500 | 2.0 | 2.0 | 2.0 | 2.0 | 2.0 | 2.0 | 2.0 | 2.0 | 2.0 | 2.0 | 2.0 | 2.0 |
| 550 | 2.0 | 2.0 | 2.0 | 2.0 | 2.0 | 2.0 | 2.0 | 2.0 | 2.0 | 2.0 | 2.0 | 2.0 |
| 600 | 2.0 | 2.0 | 2.0 | 2.0 | 2.0 | 2.0 | 2.0 | 2.0 | 2.0 | 2.0 | 2.0 | 2.0 |
| 650 | 2.0 | 2.0 | 2.0 | 2.0 | 2.0 | 2.0 | 2.0 | 2.0 | 2.0 | 2.0 | 2.0 | 2.0 |
| 700 | 2.0 | 2.0 | 2.0 | 2.0 | 2.0 | 2.0 | 2.0 | 2.0 | 2.0 | 2.0 | 2.0 | 2.0 |
| 750 | 2.0 | 2.0 | 2.0 | 2.0 | 2.0 | 2.0 | 2.0 | 2.0 | 2.0 | 2.0 | 2.0 | 2.0 |
| 800 | 2.0 | 2.0 | 2.0 | 2.0 | 2.0 | 2.0 | 2.0 | 2.0 | 2.0 | 2.0 | 2.0 | 2.0 |
| 850 | 2.0 | 2.0 | 2.0 | 2.0 | 2.0 | 2.0 | 2.0 | 2.0 | 2.0 | 2.0 | 2.0 | 2.0 |
| 900 | 2.0 | 2.0 | 2.0 | 2.0 | 2.0 | 2.0 | 2.0 | 2.0 | 2.0 | 2.0 | 2.0 | 2.0 |
| 950 | 2.0 | 2.0 | 2.0 | 2.0 | 2.0 | 2.0 | 2.0 | 2.0 | 2.0 | 2.0 | 2.0 | 2.0 |
| 1000 | 2.0 | 2.0 | 2.0 | 2.0 | 2.0 | 2.0 | 2.0 | 2.0 | 2.0 | 2.0 | 2.0 | 2.0 |
| 1050 | 2.0 | 2.0 | 2.0 | 2.0 | 2.0 | 2.0 | 2.0 | 2.0 | 2.0 | 2.0 | 2.0 | 2.0 |
| 1100 | 2.0 | 2.0 | 2.0 | 2.0 | 2.0 | 2.0 | 2.0 | 2.0 | 2.0 | 2.0 | 2.0 | 2.0 |

2202

OK    Cancel    Help

Fig-23

Air/Fuel Map

Enter Value: in A/F Vol

Fuel/Stroke (lbs/stk)   10.00

◆ Edit   ◇ Replace

| Engine Speed (rpm) | 0.00000 | 0.00022 | 0.00044 | 0.00066 | 0.00088 | 0.00110 | 0.00132 | 0.00154 | 0.00176 | 0.00198 | 0.00220 | 0.00242 |
|---|---|---|---|---|---|---|---|---|---|---|---|---|
| 350 | 10.00 | 10.00 | 10.00 | 10.00 | 10.00 | 10.00 | 10.00 | 10.00 | 10.00 | 10.00 | 10.00 | 10.00 |
| 400 | 10.00 | 10.00 | 10.00 | 10.00 | 10.00 | 10.00 | 10.00 | 10.00 | 10.00 | 10.00 | 10.00 | 10.00 |
| 450 | 10.00 | 10.00 | 10.00 | 10.00 | 10.00 | 10.00 | 10.00 | 10.00 | 10.00 | 10.00 | 10.00 | 10.00 |
| 500 | 10.00 | 10.00 | 10.00 | 10.00 | 10.00 | 10.00 | 10.00 | 10.00 | 10.00 | 10.00 | 10.00 | 10.00 |
| 550 | 10.00 | 10.00 | 10.00 | 10.00 | 10.00 | 10.00 | 10.00 | 10.00 | 10.00 | 10.00 | 10.00 | 10.00 |
| 600 | 10.00 | 10.00 | 10.00 | 10.00 | 10.00 | 10.00 | 10.00 | 10.00 | 10.00 | 10.00 | 10.00 | 10.00 |
| 650 | 10.00 | 10.00 | 10.00 | 10.00 | 10.00 | 10.00 | 10.00 | 10.00 | 10.00 | 10.00 | 10.00 | 10.00 |
| 700 | 10.00 | 10.00 | 10.00 | 10.00 | 10.00 | 10.00 | 10.00 | 10.00 | 10.00 | 10.00 | 10.00 | 10.00 |
| 750 | 10.00 | 10.00 | 10.00 | 10.00 | 10.00 | 10.00 | 10.00 | 10.00 | 10.00 | 10.00 | 10.00 | 10.00 |
| 800 | 10.00 | 10.00 | 10.00 | 10.00 | 10.00 | 10.00 | 10.00 | 10.00 | 10.00 | 10.00 | 10.00 | 10.00 |
| 850 | 10.00 | 10.00 | 10.00 | 10.00 | 10.00 | 10.00 | 10.00 | 10.00 | 10.00 | 10.00 | 10.00 | 10.00 |
| 900 | 10.00 | 10.00 | 10.00 | 10.00 | 10.00 | 10.00 | 10.00 | 10.00 | 10.00 | 10.00 | 10.00 | 10.00 |
| 950 | 10.00 | 10.00 | 10.00 | 10.00 | 10.00 | 10.00 | 10.00 | 10.00 | 10.00 | 10.00 | 10.00 | 10.00 |
| 1000 | 10.00 | 10.00 | 10.00 | 10.00 | 10.00 | 10.00 | 10.00 | 10.00 | 10.00 | 10.00 | 10.00 | 10.00 |
| 1050 | 10.00 | 10.00 | 10.00 | 10.00 | 10.00 | 10.00 | 10.00 | 10.00 | 10.00 | 10.00 | 10.00 | 10.00 |
| 1100 | 10.00 | 10.00 | 10.00 | 10.00 | 10.00 | 10.00 | 10.00 | 10.00 | 10.00 | 10.00 | 10.00 | 10.00 |

2302

OK   Cancel   Help

Fig-24

Wastegate Parameters

File Name: /usr/users/lewis/develop/maps/930819.GWG

Gain: 1.0000    DDT: 0 ◄►

Stability: 1.0000    DDT: 0 ◄►

Normal Compensation: 1.0000    DDT: 0 ◄►

Online Compensation: 1.0000

Apply DDT Offsets

2402

OK    Cancel    Options    Help

Feedback Points

Feedback Load Point: 50    2502

Feedback Speed Point: 650

[OK]  [Cancel]  [Help]

*Fig_25_*

Btu Settings

Minimum BTU Setting: 700

Maximum BTU Setting: 1200

Typical BTU Setting: 900

[OK]  [Cancel]  2602  [Help]

*Fig_26_*

Fuel Factors

2702

80
Low Factor Warning

120
High Factor Warning

[ OK ]   [ Cancel ]   [ Help ]

Fig_27_

Steady State Timing Parameters

3202

|  | Minimum | Maximum | Increment | Positions |
|---|---|---|---|---|
| Fuel/Stroke (lbs/stk) | 0.00000 | 0.00330 | 0.00022 | 16 |
| Engine Speed (rpm) | 0 | 1125 | 75 | 16 |

18
Crank Angle Sensor Location in degrees ATDC

[ OK ]   [ Cancel ]   [ Help ]

Fig_32_

Fig. 28

Transient Air/Fuel Map

Enter Value: in A/F Vol    Air/Stroke (lbs/stk)   17.44    ◆ Edit   ◇ Replace

| Engine Speed (rpm) | 0.0000 | 0.0100 | 0.0200 | 0.0300 | 0.0400 | 0.0500 | 0.0600 | 0.0700 | 0.0800 | 0.0900 | 0.1000 | 0.1100 | 0.1200 | 0.1300 |
|---|---|---|---|---|---|---|---|---|---|---|---|---|---|---|
| 0 | 17.44 | 17.44 | 17.44 | 17.44 | 17.20 | 15.05 | 13.03 | 12.04 | 12.04 | 12.04 | 12.04 | 12.04 | 12.04 | 12.04 |
| 75 | 17.44 | 17.44 | 17.44 | 17.44 | 16.97 | 15.05 | 13.03 | 12.04 | 12.04 | 12.04 | 12.04 | 12.04 | 12.04 | 12.04 |
| 150 | 17.44 | 17.44 | 17.44 | 17.44 | 16.97 | 15.05 | 13.03 | 12.04 | 12.04 | 12.04 | 12.04 | 12.04 | 12.04 | 12.04 |
| 225 | 17.32 | 17.32 | 17.32 | 17.20 | 16.86 | 15.05 | 13.03 | 12.04 | 12.04 | 12.04 | 12.04 | 12.04 | 12.04 | 12.04 |
| 300 | 16.97 | 16.86 | 16.97 | 16.86 | 16.74 | 15.05 | 13.03 | 12.04 | 12.04 | 12.04 | 12.04 | 12.04 | 12.04 | 12.04 |
| 375 | 16.53 | 16.53 | 16.53 | 16.53 | 16.63 | 15.05 | 13.03 | 12.04 | 12.04 | 12.04 | 12.04 | 12.04 | 11.55 | 11.55 |
| 450 | 15.23 | 15.23 | 15.23 | 15.23 | 15.23 | 14.96 | 14.28 | 11.55 | 11.55 | 11.55 | 11.55 | 11.55 | 10.53 | 10.53 |
| 525 | 15.23 | 15.23 | 15.23 | 15.23 | 15.23 | 14.96 | 14.28 | 10.53 | 10.53 | 10.53 | 10.53 | 10.53 | 10.53 | 10.53 |
| 600 | 15.23 | 15.23 | 15.23 | 15.23 | 15.14 | 14.79 | 14.13 | 10.53 | 10.53 | 10.53 | 10.53 | 10.53 | 10.53 | 10.53 |
| 675 | 15.14 | 15.14 | 15.14 | 15.14 | 15.05 | 14.70 | 13.89 | 11.04 | 11.04 | 11.04 | 11.04 | 11.04 | 11.04 | 11.04 |
| 750 | 15.14 | 15.14 | 15.14 | 15.14 | 15.05 | 14.62 | 13.45 | 11.04 | 11.04 | 11.04 | 11.04 | 11.04 | 11.04 | 11.04 |
| 825 | 15.90 | 15.90 | 15.90 | 15.90 | 15.90 | 13.97 | 12.21 | 11.04 | 11.04 | 11.04 | 11.04 | 11.04 | 11.04 | 11.04 |
| 900 | 16.53 | 16.53 | 16.63 | 16.63 | 16.63 | 13.97 | 12.33 | 11.04 | 11.04 | 11.04 | 11.04 | 11.04 | 11.04 | 11.04 |
| 975 | 16.97 | 16.97 | 16.97 | 16.97 | 16.97 | 13.97 | 11.93 | 11.04 | 11.04 | 11.04 | 11.04 | 11.04 | 11.04 | 11.04 |
| 1050 | 16.97 | 16.97 | 16.97 | 16.97 | 16.97 | 13.97 | 11.93 | 11.04 | 11.04 | 11.04 | 11.04 | 11.04 | 11.04 | 11.04 |
| 1125 | 16.97 | 16.97 | 16.97 | 16.97 | 16.97 | 13.97 | 11.93 | 11.04 | 11.04 | 11.04 | 11.04 | 11.04 | 11.04 | 11.04 |

2802

OK   Cancel   Help

Fig_29

Torque Limit Map

Enter Value:
in lbs/min
8.75

◆ Edit   ◇ Replace

2902

| Fuel Flow (lbs/min) | |
|---|---|
| 0 | 8.75 |
| 75 | 8.75 |
| 150 | 8.75 |
| 225 | 8.75 |
| 300 | 8.75 |
| 375 | 8.75 |
| 450 | 8.75 |
| 525 | 8.63 |
| 600 | 9.25 |
| 675 | 13.63 |
| 750 | 15.25 |
| 825 | 16.63 |
| 900 | 17.88 |
| 975 | 20.38 |
| 1050 | 20.38 |
| 1125 | 20.25 |

Engine Speed (rpm)

OK    Cancel    Help

Fig-30

Idle Fuel Map

Enter Value: 1.11
in lbs/min

◆ Edit  ◇ Replace

| Fuel Flow (lbs/min) | |
|---|---|
| | 1.11 |
| 75 | 2.22 |
| 150 | 3.33 |
| 225 | 4.44 |
| 300 | 5.55 |
| 375 | 6.66 |
| 450 | 7.77 |
| 525 | 8.88 |
| 600 | 9.99 |
| 675 | 10.10 |
| 750 | 11.11 |
| 825 | 12.12 |
| 900 | 13.13 |
| 975 | 14.14 |
| 1050 | 15.15 |
| 1125 | 16.16 |

Engine Speed (rpm)

3002

OK    Cancel    Help

Fig-31

Timing Retard Map

Enter Value: in degrees  5.6

◆ Edit  ◇ Replace

3102

| % Air Pressure Error | Timing Retard (deg) |
|---|---|
| 10.0 | 5.6 |
| 12.5 | 5.6 |
| 1.50 | 5.6 |
| 17.5 | 5.6 |
| 20.0 | 5.6 |
| 22.5 | 5.6 |
| 25.0 | 5.5 |
| 27.5 | 5.3 |
| 30.0 | 5.2 |
| 32.5 | 5.1 |
| 35.0 | 5.0 |
| 37.5 | 5.0 |
| 40.0 | 4.9 |
| 42.5 | 4.8 |
| 45.0 | 4.7 |
| 47.5 | 4.7 |

OK  Cancel  Help

Figure 34:
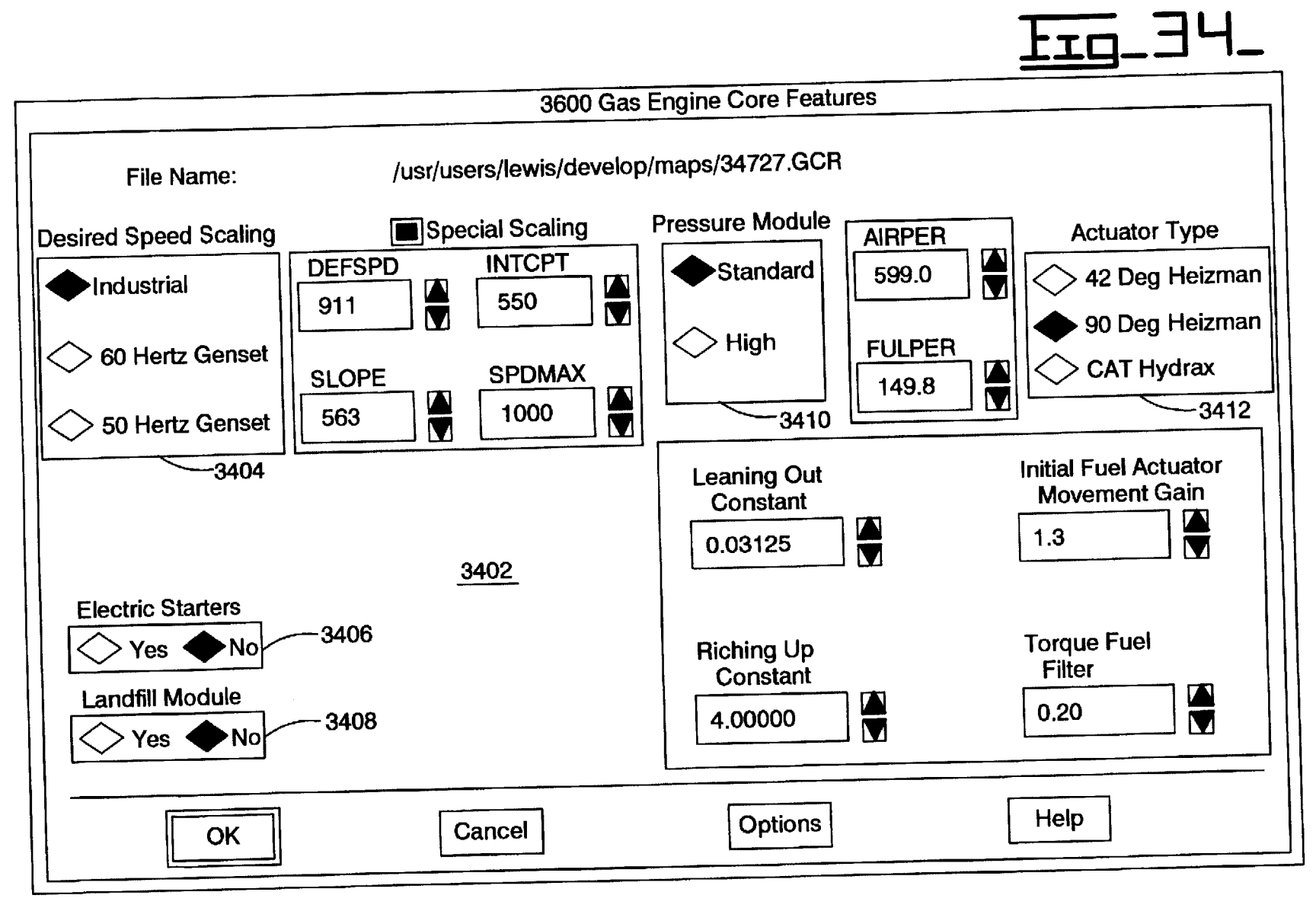

3600 Gas Engine Core Features

File Name: /usr/users/lewis/develop/maps/34727.GCR

☐ Special Scaling

Desired Speed Scaling
- ◆ Industrial
- ◇ 60 Hertz Genset
- ◇ 50 Hertz Genset

3404

DEFSPD: 911
INTCPT: 550
SLOPE: 563
SPDMAX: 1000

Pressure Module
- ◆ Standard
- ◇ High

3410

AIRPER: 599.0
FULPER: 149.8

Actuator Type
- ◇ 42 Deg Heizman
- ◆ 90 Deg Heizman
- ◇ CAT Hydrax

3412

Initial Fuel Actuator Movement Gain: 1.3

Torque Fuel Filter: 0.20

Leaning Out Constant: 0.03125

Riching Up Constant: 4.00000

3402

Electric Starters
- ◇ Yes ◆ No

3406

Landfill Module
- ◇ Yes ◆ No

3408

[ OK ]   [ Cancel ]   [ Options ]   [ Help ]

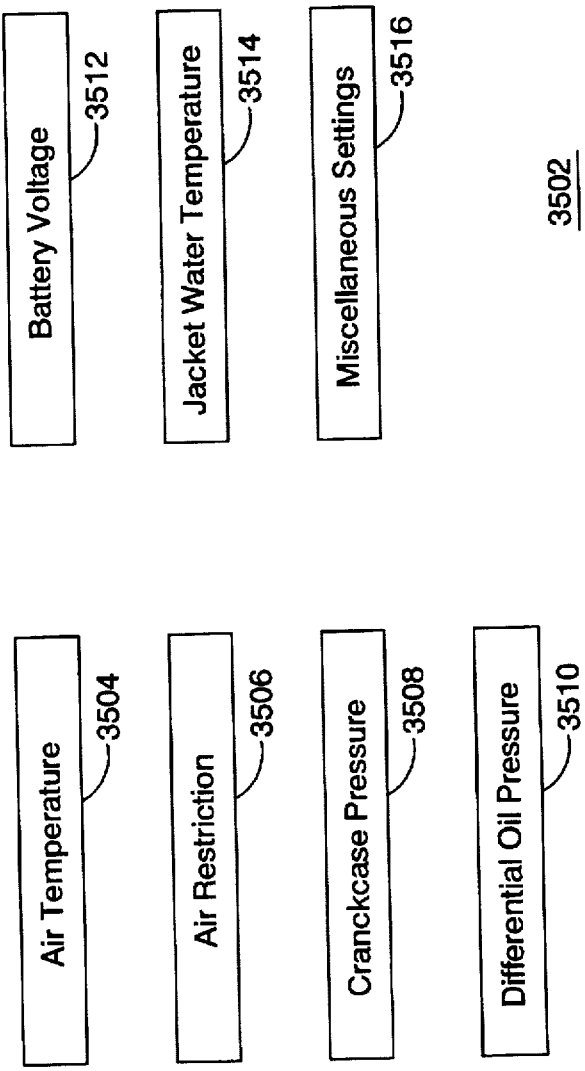

Air Temperature Parameters

80
Shutdown Temperature at less than 50% Load (Celsius)

60
Caution Temperature greater than 50% Load (Celsius)

65
Shutdown Temperature greater than 50% Load (Celsius)

[ OK ]  [ Cancel ]  3602  [ Help ]

Fig_36_

Air Restriction

— 3704
■ Enabled          — 3712
3.6
Left Air Restriction Caution (KPa)

— 3708
■ Enabled          — 3716
3.4
Right Air Restriction Caution (KPa)

— 3706
■ Enabled          — 3714
5.3
Left Air Restriction Shutdown (KPa)

— 3710
■ Enabled          — 3718
5.1
Right Air Restriction Shutdown (KPa)

[ OK ]  [ Cancel ]  3702  [ Help ]

Fig_37_

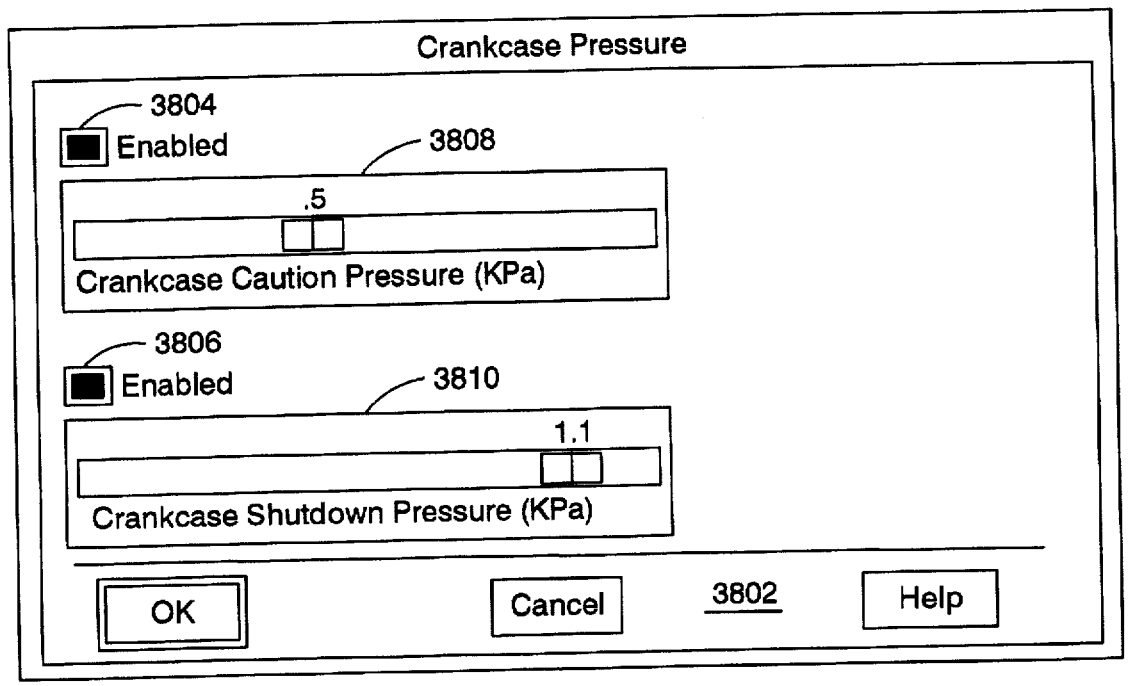
Fig_38_
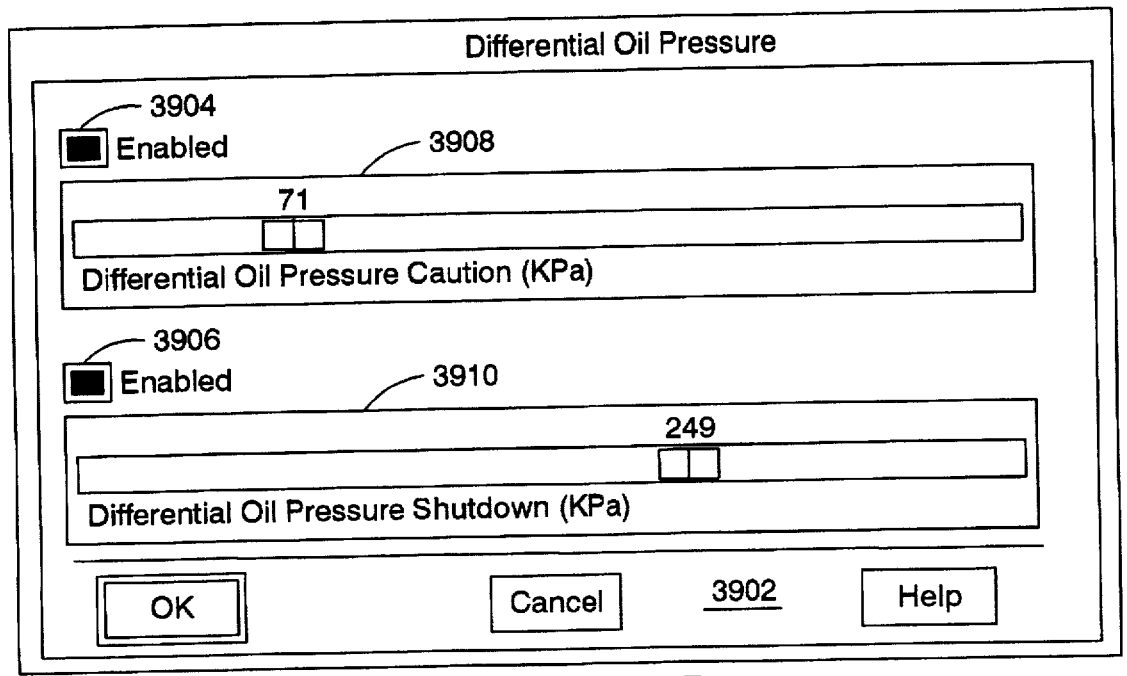
Fig_39_

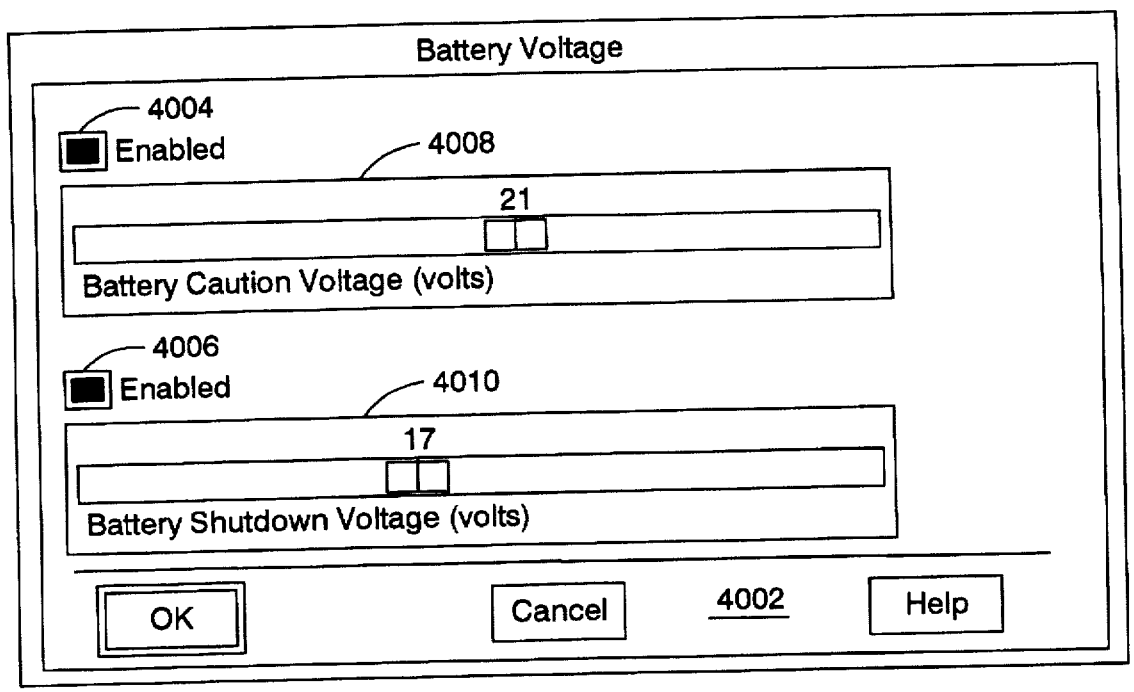
Fig_40_
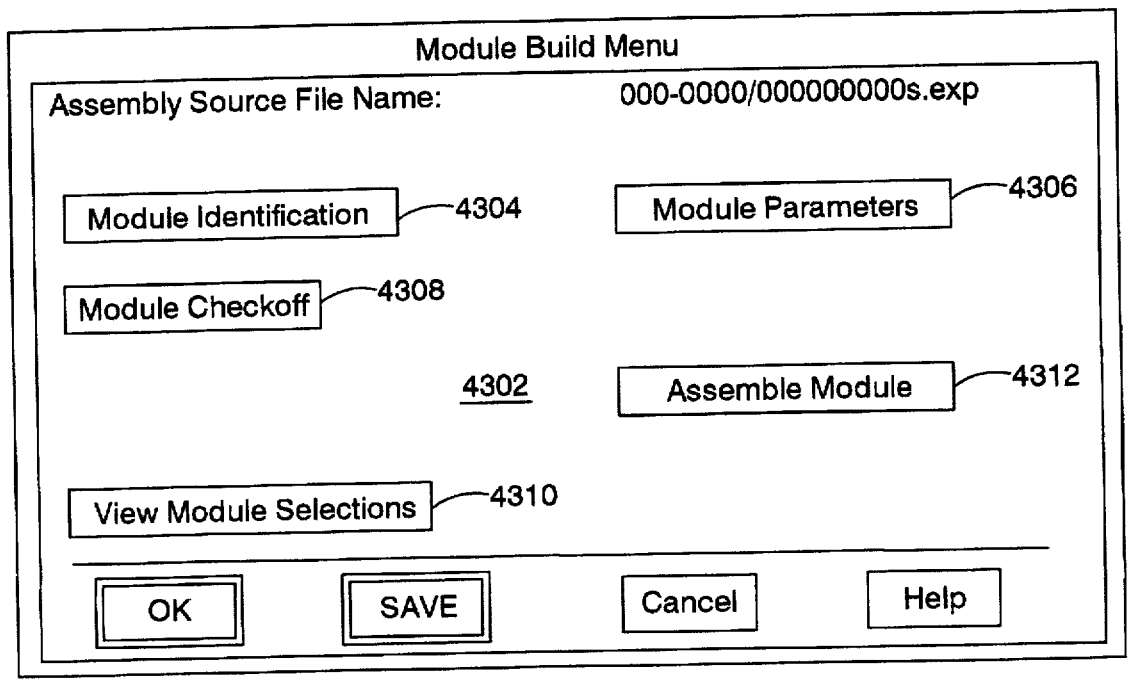
Fig_43_

Fig. 42

Miscellaneous Protection Parameters

Pre-Lube Time (Seconds) 31
Post-Lube Time (Seconds) 59
Driven Equipment Ready Time (Seconds) 41

Pre-Lube Time (Minutes) 0
Post-Lube Time (Minutes) 0
Driven Equipment Ready Time (Minutes) 0

| | Shutdown | Alarm | Not Used |
|---|---|---|---|
| Driven Equipment Input | ◇ | ◆ | ◇ |
| Exhaust Pyrometer Input | ◇ | ◆ | ◇ |
| Low Coolant Level Input | ◇ | ◆ | ◇ |
| Low Oil Level Input | ◆ | ◇ | ◇ |
| Detonation Strategy | ◇ | ◆ | ◇ |

OK    Cancel    Help

_Fig. 44_

Module Identification

Personality Part Number  4404 — [000] [0000]  Change Level [00] — 4408

Developer Name (First Last)  4406 — [Caterpillar Inc.]

4402

[OK]  [Cancel]  [Help]

Fig-45

Module Parameters

Number of Cylinders [ 6 ]   Development Level [ Experimental ]   HW Change Level [ 06 ]

Application Type: [ TEMPLATE ]

Available Types
- DANISH
- TEMPLATE

Selection [ DANISH ]

[ OK ]  [ Cancel ]  [ Help ]

4502

SW Level: [ chg03_aug93 ]

Available Levels
- chg01_jun93
- chg02_jul93
- chg03_aug93
- chg04_sep93

Selection [ chg03_aug93 ]

[ OK ]  [ Cancel ]  [ Help ]

[ OK ]  [ Cancel ]  [ Help ]

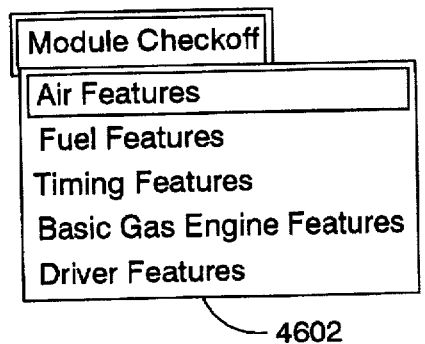
Fig_46_
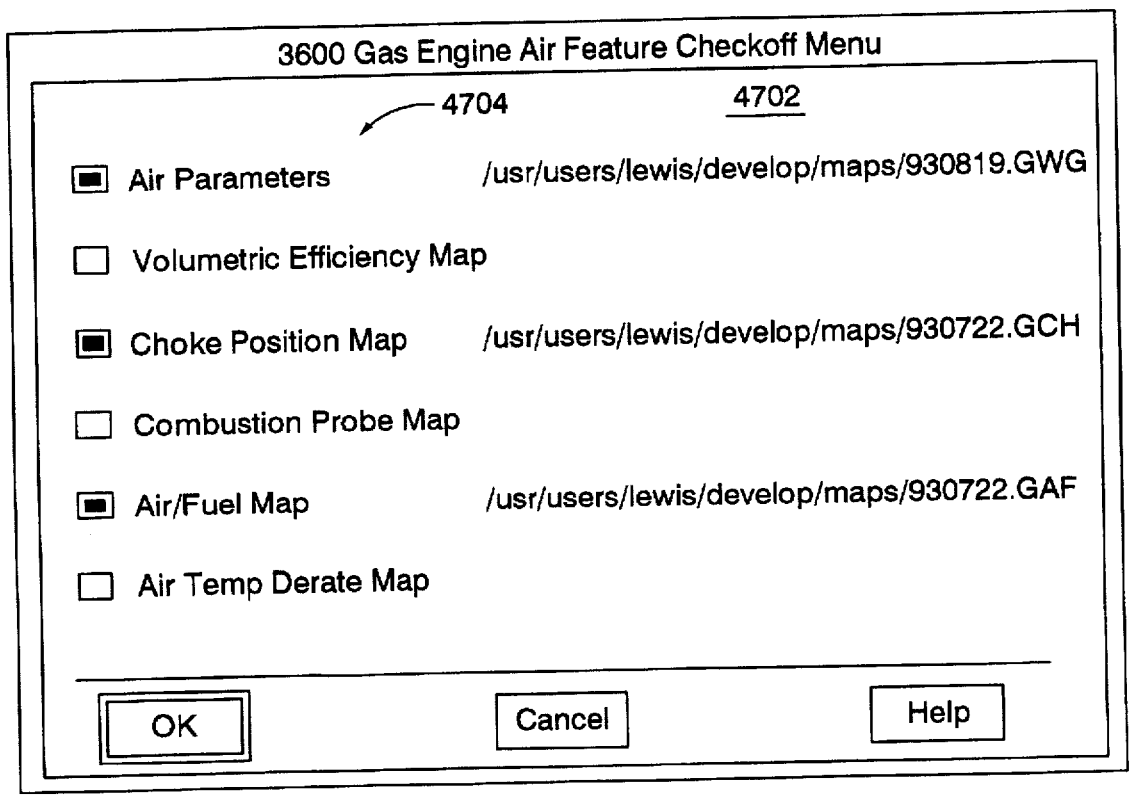
Fig_47_

Fig-48

View Module

Enter Value: [Choke Position]

| | Type | Sub-Type | Description/File name |
|---|---|---|---|
| 1 | Air | Air Parameters | *sr/users/lewis/develop/map* |
| 2 | Air | Choke Position | *ers/lewis/develop/maps/930* |
| 3 | Air | Air Fuel | *ers/lewis/develop/maps/930* |

4802

[OK] [Cancel] [Help]

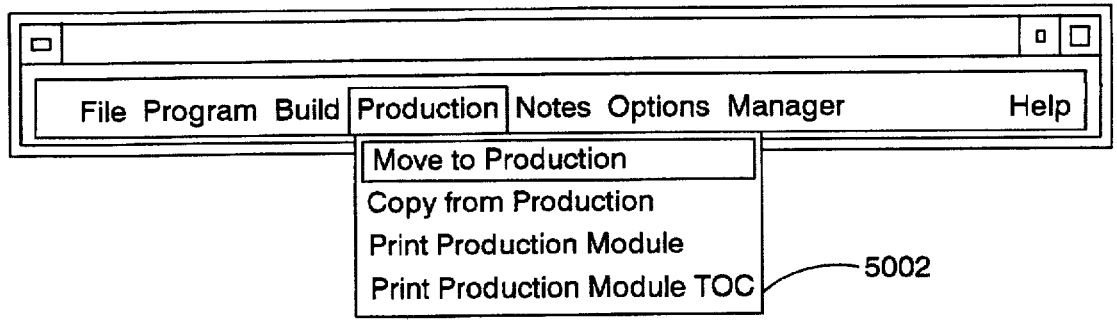
Fig_50_
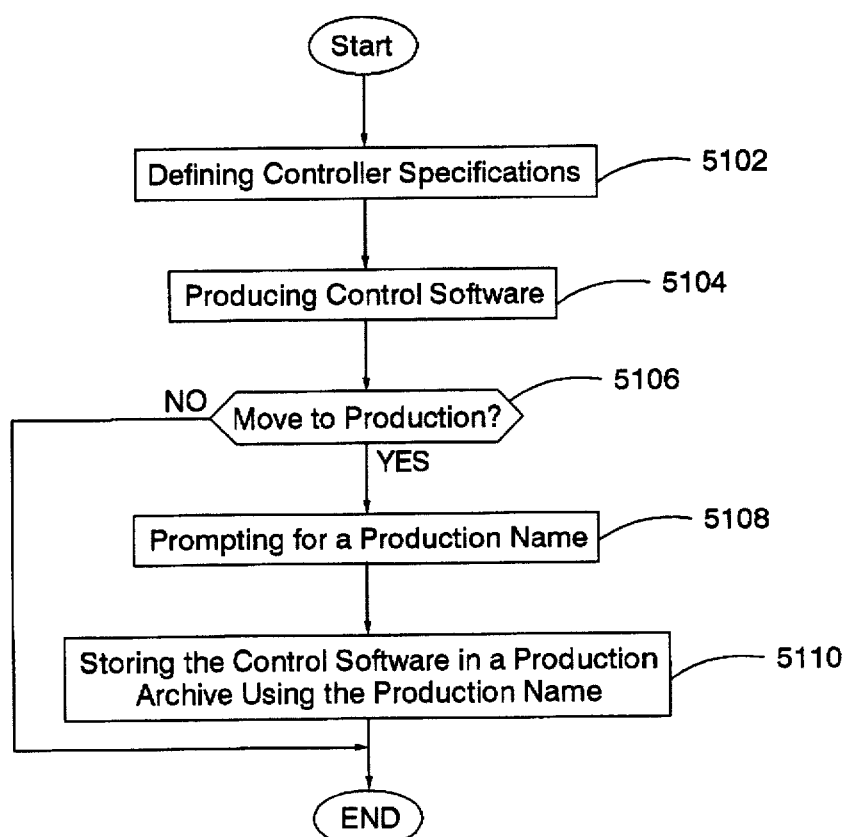
Fig_51_

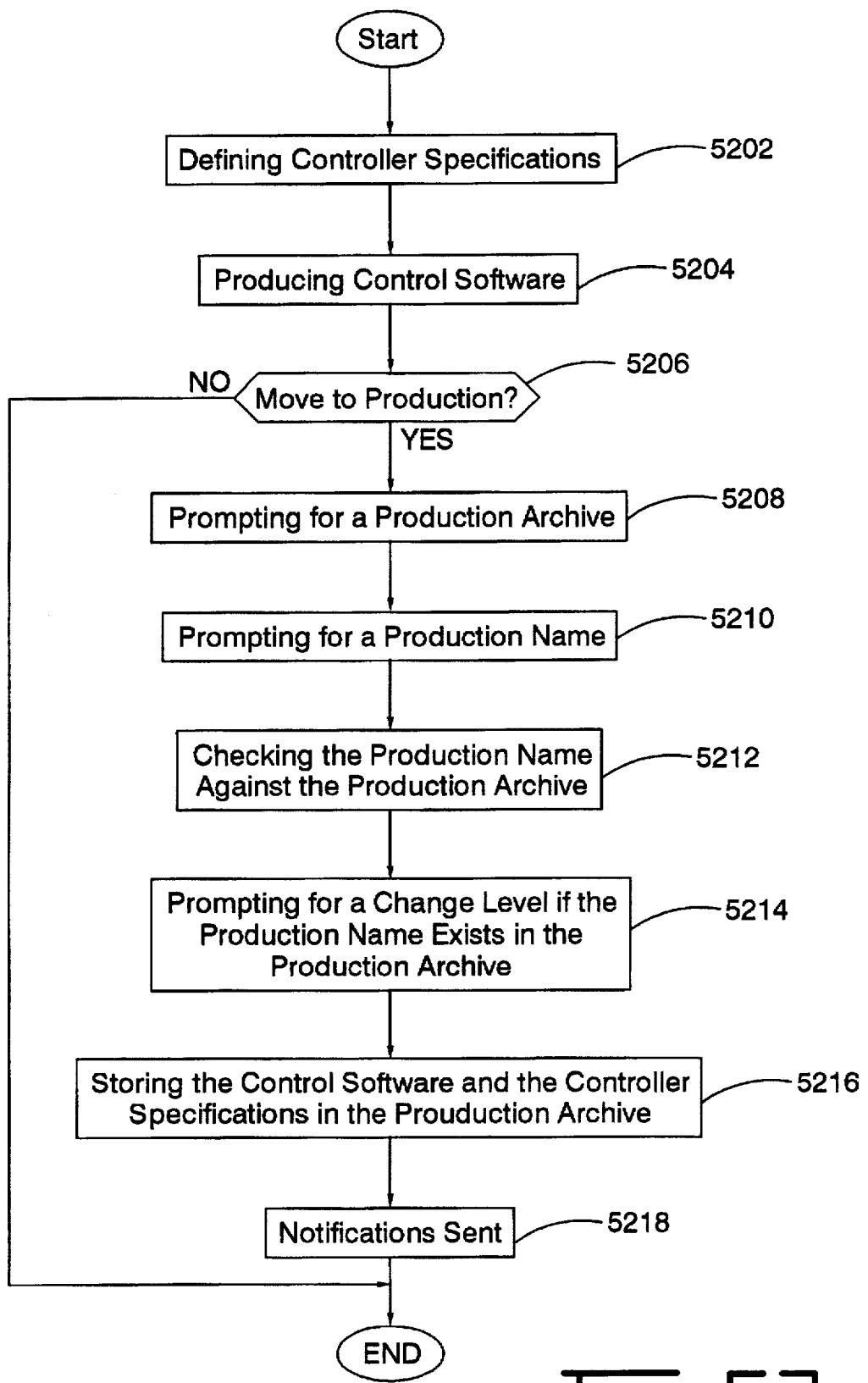
Fig_52_

METHOD FOR PRODUCING PRODUCTION CONTROL SOFTWARE FOR A NATURAL GAS ENGINE CONTROLLER

I. TECHNICAL FIELD

This invention relates generally to electronic controllers and more particularly to a method for programming a natural gas engine electronic controller based on user input.

II. BACKGROUND ART

Electronic controllers, typically microprocessor based, are being increasingly used. For example, electronic controllers are commonly used to control engines. The electronic engine controller typically receives specific sensor information and controls operation of the engine in accordance with a preprogrammed set of rules.

The evolving complexity and use of electronic controllers has demanded increasing design time. Each application is different, requiring a different set of sensors, different data, and different software. Even electronic controllers designed to control similar devices may require different sensors, data and software. Thus, an engine controller, for example, must be designed and a unique set of rules must be written for each engine application.

Therefore, it became desirable to have a basic electronic controller system or platform for similar devices which is flexible. The electronic engine controller platform can be adapted/configured to work on various types, models, series or configurations of similar devices. However, each application has different requirements and specifications. Thus, utilization of the basic platform requires significant engineering design time and software engineer programming.

The present invention is directed to overcoming one or more of the problems set forth above.

III. DISCLOSURE OF THE INVENTION

In one aspect of the present invention, a method of operating a computer to produce control software for an electronic controller for a natural gas engine is provided. The method includes the steps of defining a set of air features, a set of fuel features, and a set of timing features of the electronic controller and the natural gas engine as a function of user input and producing control software to operate the controller as specified by the specifications.

In a second aspect of the present invention, a method of operating a computer to produce control software for an electronic controller for a natural gas engine is provided. The method includes the steps of defining a set of air features, a set of fuel features, a set of timing features, a set of engine core features, and a set of protection features of the electronic controller and the natural gas engine as a function of user input and producing control software to operate the controller as specified by the specifications.

IV. BRIEF DESCRIPTION OF THE DRAWINGS

For a better understanding of the present invention, reference may be made to the accompanying drawings, in which:

FIG. 2 is a diagrammatic illustration of an Application Builder adapted to produce control software for an engine, illustrating user input and different engine applications;

FIG. 3 is a diagrammatic view of the main menu of the Application Builder, according to an embodiment of the present invention;

FIG. 4 is a diagrammatic view of the main menu of FIG. 3, illustrating an exemplary menu architecture;

FIG. 5 is a diagrammatic view of a pushbutton;

FIG. 6 is a diagrammatic view of a text field;

FIG. 7 is a diagrammatic view of an option menu;

FIG. 8 is a diagrammatic view of a slider;

FIG. 9 is a diagrammatic view of a toggle button;

FIG. 10 is a diagrammatic view of a radio box;

FIG. 11 is a diagrammatic view of a selection box;

FIG. 12 is a diagrammatic view of an error dialog popup;

FIG. 13 is a diagrammatic view of a question dialog popup;

FIG. 14 is a diagrammatic view of a file selection dialog popup window;

FIG. 15 is a diagrammatic view of a file print dialog popup;

FIG. 16 is a diagrammatic view of a natural gas engine and control system;

FIG. 17 is a diagrammatic view of the main menu of the Application Build of FIG. 2 showing the Options Menu Structure FIG. 18 is a table illustrating the user definable specifications for a natural gas engine user;

FIG. 19 is a diagrammatic view of a Wastegate Parameters Window;

FIG. 20 is a diagrammatic view of a Volumetric Efficiency Map Window;

FIG. 21 is a diagrammatic view of a Choke Map Window;

FIG. 22 is a diagrammatic view of a Combustion Probe Map Window;

FIG. 23 is a diagrammatic view of an Air/Fuel Map Window;

FIG. 24 is a diagrammatic view of a Governor Parameters Window;

FIG. 25 is a diagrammatic view of a Feedback Points Window;

FIG. 26 is a diagrammatic view of a BTU Settings Window;

FIG. 27 is a diagrammatic view of a Fuel Factors Window;

FIG. 28 is a diagrammatic view of a Transient Air/Fuel Map Window;

FIG. 29 is a diagrammatic view of a Torque Limit Map Window;

FIG. 30 is a diagrammatic view of an Idle Fuel Map Window;

FIG. 31 is a diagrammatic view of a Timing Retard Map Window;

FIG. 32 is a diagrammatic view of a Steady State Timing Parameters Window;

FIG. 33 is a diagrammatic view of a Steady State Timing Map Window;

FIG. 34 is a diagrammatic view of an Engine Core Features Window;

FIG. 35 is a diagrammatic view of a Protection Features Window;

FIG. 36 is a diagrammatic view of an Air Temperature Parameters Windows;

FIG. 37 is a diagrammatic view of an Air Restriction Window;

FIG. 38 is a diagrammatic view of a Crankcase Pressure Window;

FIG. 39 is a diagrammatic view of a Differential Oil Pressure Window;

FIG. 40 is a diagrammatic view of a Battery Voltage Window;

FIG. 42 is a diagrammatic view of a Miscellaneous Protection Parameters Window;

FIG. 43 is a diagrammatic view of a Module Build Menu;

FIG. 44 is a diagrammatic view of a Module identification window;

FIG. 45 is a diagrammatic view of a Module Parameters Window;

FIG. 46 is a diagrammatic view of a Module Checkoff menu;

FIG. 47 is a diagrammatic view of an Air Features Checkoff Window;

FIG. 48 is a diagrammatic view of a View Module Window;

FIG. 50 is a diagrammatic view of the Production Menu structure of the Main Menu;

FIG. 51 is a control diagram illustrating a first embodiment of the present invention; and, FIG. 52 is a control diagram illustrating a second embodiment of the present invention.

VI. BEST MODE FOR CARRYING OUT THE INVENTION

A. Copyright

Figure 1B:
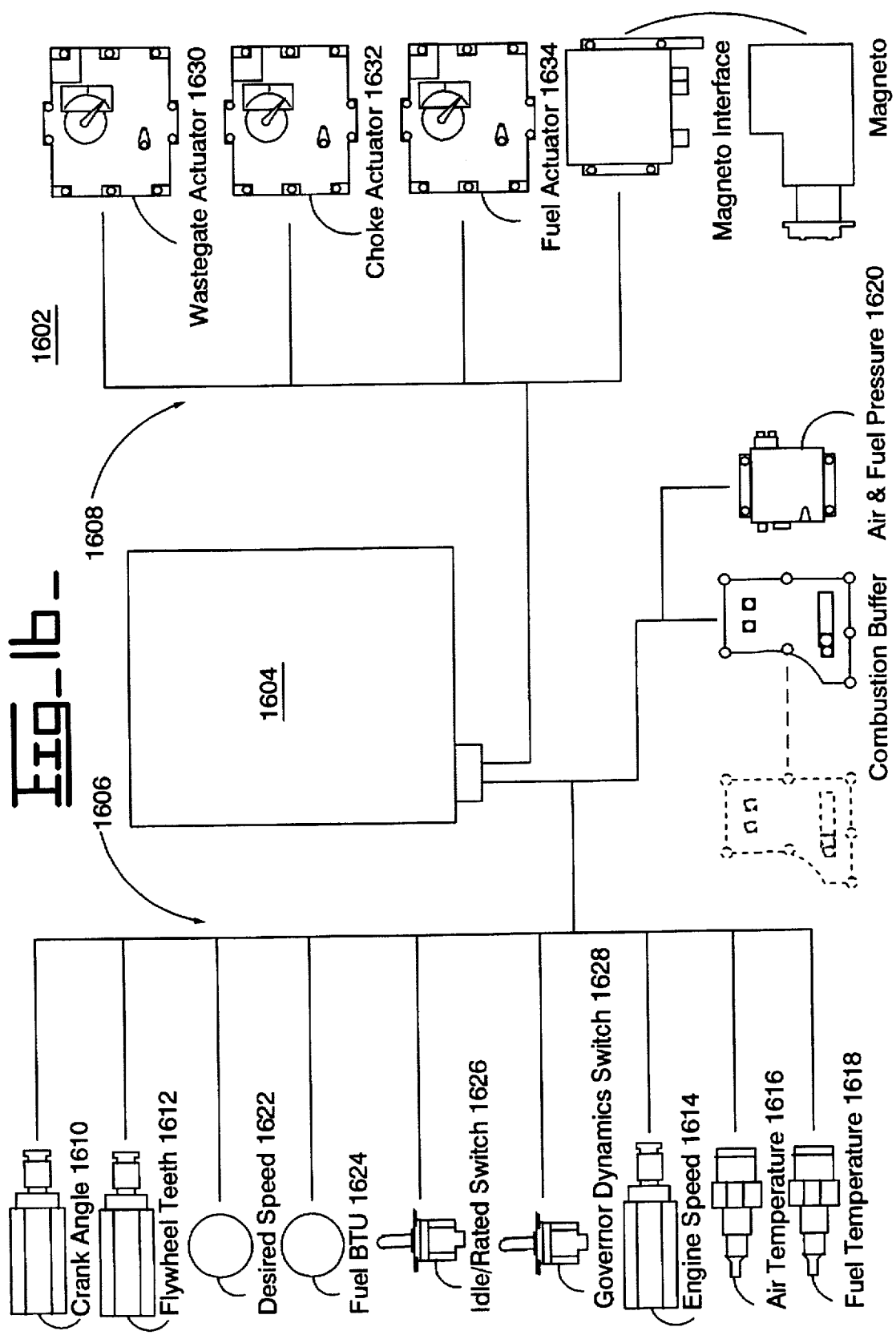
FIG. 1 is a block diagram of the present invention, illustrating an Application Builder, a controller, and a controlled device.

Portions of the disclosure of this patent document contain material which is subject to copyright protection. The copyright owner has no objection to the facsimile production by anyone of the patent document or the patent disclosure as it appears in the Patent and Trademark Office patent file or records, but otherwise reserves all copyright rights whatsoever.

B. Introduction

Referring to the Figs., the present invention provides a method of operating a computer (Application builder) 102 to produce control software for a controller 104. The controller 104 is adapted to control an engine 106 which runs on natural gas, based on various inputs.

The Application Builder 102 generally allows for user input of the specifications of the target controller and engine 104,106 and produces the control software for the defined engine application. Application Builder 102 accepts user input for a specific engine application and produces the control software for the defined application. For example, the type of user input may include the number of cylinders and whether specific features are to be enabled.

In the one embodiment, the Application Builder 102 utilizes a database of software code and the user defined parameter information and configuration data. The parameter information and configuration data is converted into a machine format and placed in a file. The file may then be downloaded to the target controller for testing. A database includes sets of default parameters and configurations which are dependent upon choices made by the user.

In a second embodiment, the Application Builder converts the user input specifications into machine code which can be run directly by the target controller.

The present invention is embodied in a computer 108. The computer is programmed to receive user input and to produce the control software. The user inputs the parameters of the target controller as discussed below. The computer may be a microcomputer, a mainframe, a general purpose computer, or any suitable computer system. In the preferred embodiment, the present invention is embodied in a programmed DEC ULTRIX workstation running the ULTRIX operating system. The Application Builder can be accessed via any workstation connected or networked to the programmed workstation.

The present invention is designed to be used in the development of production control software for a controller. The controller may be a new design or a new configuration built on a common platform. The present invention provides a method whereby a user, knowing the specifications of the target controller, inputs the specifications of the target controller and the control software is produced. The user does not have to be a computer programmer or have any computer programming experience.

With reference to FIG. 2, the main screen 202 of the Application Builder (AB) 102 is illustrated. The main screen 202 includes a pull down menu bar 204 with a plurality of pull down menus. In the preferred embodiment, the pulldown menus includes "File", "Program", "Build", "Production", "Notes", "Options", and "Help". The pull down menus have the following functions:

File: The File menu item is used to exit the Application Builder Program.

Program: The Program menu item is used to enter data for the various features of the target controller.

Build: The Build menu item is used to build the top level source filed for the target controller.

Production: The Production menu item is used to archive a configuration for production status.

Notes: The Notes menu item is used to view the Application Builder Release Notes.

Options: The Options menu item is used for selecting the download queue and user environment for Application Builder.

Help: The Help menu item is used to display the top level help information for Application Builder.

Each menu may include a number of selectable items or sub-menus, as illustrated in FIG. 3.

Throughout the Application Builder 102 certain conventions are used. All data input and menu windows contain three standard control buttons: "OK", "Cancel", and "Help". An additional "Options" control button appears on each menu window. The standard control buttons have the following functions:

OK: The OK button is used to accept the data currently displayed within the window.

Cancel: The Cancel button will discard any changes made in the current window and any subwindow.

Options: The Options button will display a popup window with additional functions that can be performed, e.g., "Print", "Plot", "Download", "Add/Edit Note", "Import", and "Save". Specific options are not available for all features. The Add/Edit Note option allows a text note to be attached to the current map or module. The Import features allows data to be read from files which have been saved in different file formats.

Help: The Help button will display information relating to the current window.

With reference to FIGS. 4-15, data is entered using various methods in the data input windows. A pushbutton or button 402 is activated by positioning a pointer (via a mouse) on the button and clicking (pressing and releasing) a first mouse button (MB1). The user must supply the requested information in a text field 502 followed by a TAB or RETURN. If the entered information is not valid, an error message will be displayed. To select an option within an option menu 602, the user placed the pointer on the option menu and presses (and holds) MB1. A list of menu items will be displayed. To select the desired option, the user moves the pointer to the desired option and releases MB1.

To select a value via a slider 702, the user positions the pointer on a slider bar 704 and presses MB1. While holding MB1, the slider bar 704 can be moved until the desired value is displayed.

A toggle button 802 indicates a True/False or On/Off value. To change the state of a toggle button, the user position the pointer on the button and clicks MB1.

A radio box 902 is a collection of toggle buttons, where only one of the toggle buttons can be active or on at one time.

Selection boxes 1002 display a list of options 1004 and a selection edit field 1006. An option from the list may be selected by clicking MB1 with the pointer on the item in the list or the selection may be entered manually in the selection edit field. After an item is selected, a row of control pushbuttons 1008 is used to accept or cancel the selection.

Popups or windows appear in certain situations, asking for specific data or confirming a specific action.

When an error condition is encountered, an Error Popup 1102 with an appropriate error message will be displayed. Clicking MB1 with the pointer positioned on the OK or Cancel pushbutton will remove the Error Popup 1102 and allow the re-entry of data that caused the error.

When a change in parameters will cause rows and/or columns to be deleted from a map, a Question Dialog Popup 1202 will be displayed, confirming the action.

When the input of a FILENAME is required, a File Selection Popup 1302 appears. A Filter Field 1304 contains a wildcard specification. A Directories field 1306 and a Files Field 1308 display the available directories and the files which meet the requirements of the Filter Field 1304, respectively. To select a file, the pointer is positioned on a filename in the Files field 1308 and MB1 is clicked. The selected file will be highlighted and displayed in a Selection Edit Field 1310. Optionally, a filename may be entered manually in the selection edit field 1310.

A File Print Popup 1402 displays the printers available and allows for the selection of various print options.

Some selection boxes are displayed as separate popups. After the desired selection is made, the popup is removed. Additionally, data entry, for example, entry into a test field, may be done via a popup.

Various features of the target controller 104 may require a map, i.e., an array of operating data. An exemplary map data window 1502 is shown in FIG. 15. The map data window 1502 provides the mechanism for entering data, and for some maps, for manipulating the size of the map itself. Data may be entered as an absolute value or an increment/ multiple of the current value. Each individual data value is displayed in a cell. One cell will always be the active cell and is indicated by a highlighted border. Groups of cells may be selected in order to update multiple cells. Selected cells are highlighted (in reverse video).

In general, maps may be updated using various techniques. A list of the techniques is listed below. However, it should be noted that not all techniques are supported by all maps.

Row Update: Clicking MB1 with the pointer in one of the header columns on the left side of a map will highlight the row in which the pointer is positioned. Any data modification will affect the entire row, including any cells that are not visible.

Column Update: Clicking MB1 with the pointer in one of the header columns at the top of a map will highlight the column in which the pointer is positioned. Any data modification will affect the entire column, including any cells that are not visible.

Range Update: Pressing and holding MB1 while dragging the pointer will highlight a rectangular group of cells. When MB1 is released, the selection is complete. Any data modification will now affect the selected cells.

Map Update: Clicking MB1 with the pointer in the extreme upper left corner of the map, will select and highlight the entire map. Any data modifications will affect the entire map, including any cells which are not visible.

Discontiguous Update: This method is similar to the Range Update technique, but is preceded by pressing and holding the <Shift> key. As long as the <Shift> key is held, additional selections, either ranges or individual cells, will be selected. Any data modifications will affect all selected cells and/or ranges of cells.

By default, map data entry defaults to an ENTRY mode. In the ENTRY mode, the data in the currently active cell is displayed in the data entry text field and the displayed value may be modified. Pressing a REPLACE toggle button, changes data entry to a REPLACE mode. In the REPLACE mode, entry of the first character will result in the removal of the current value.

Modifications to the map data may be entered in several ways. A simple numeric value is interpreted as an absolute entry and the entered value will be placed in the map as it was entered.

Additionally, data entries may be modified incrementally. The first character in the data input is used to indicated the type of incremental modification to be performed. The supported modifications are: addition (+), subtraction (−), multiplication (*), and division (/). The value that follows one of these operators is used to modify the value in the selected cell or cells. For example, an entry of *1.25 indicates that the value in the currently selected cell or cells should be increased be 25 percent.

Some maps are variable in size. Maps will be sized via a Parameters input window. Additionally, rows and/or columns may be added or deleted from the map data window. Clicking a second mouse button (MB2) with the pointer positioned in one of the headers (row or column) will display a dialog box for deleting or inserting a column.

In the preferred embodiment, the size of the maps for a Gas User are fixed.

C. Natural Gas Engine Controller

As stated above, the Application Builder 102 is adaptable to produce control software for different types of target controllers. However for purposes of discussion only, a specific type of controller will be discussed.

With reference to FIG. 16, an exemplary natural gas engine controller 1602 includes an electronic control module or ECM 1604 and a personality module. Preferably, the ECM 1604 includes one or more microprocessors. The personality module contains the software for the ECM 1604 and also stores the operating maps that define certain operating curves, e.g., horsepower and torque. The ECM 1604 and the personality module operate together, along with a plurality of sensors 1606 and a plurality of actuators 1608.

In general, the ECM 1604 receives information from the sensors 1606 and controls the engine 106 via the actuators 1608.

In one embodiment, the plurality of sensors 1606 includes a crank angle sensor 1610, a flywheel teeth sensor 1612, an engine speed sensor 1614, an air temperature sensor 1616, a fuel temperature sensor 1618, and a combined air and fuel pressure sensor 1620. The ECM 1604 also receives relevant information from a desired speed potentiometer 1622, a fuel BTU potentiometer 1624, an idle/rated switch 1626 and a governor dynamics switch 1628.

Operation of the natural gas engine 104 is controlled through the various actuators 1608. In the illustrated embodiment, the engine 104 is controlled via a wastegate actuator 1630, a choke actuator 1632, a fuel actuator 1634.

D. Inputting the Target Controller's Specifications.

Using the options under the Program menu, the user configures and defines the specifications of the target application builder 102. The specifications of the target controller are known as configuration data.

In the illustrated embodiment, the Application Builder 102 is adapted to produce the control software for a controller for a diesel engine and for a controller for an engine which runs on natural gas. Software engineers design and program core software routines. The Application Builder 102 combines the core software routines and the configuration data to produce the control software.

As shown in FIG. 17, the target controller is defined via a User Profile option under the Options menu. Currently, the two available options are Diesel User and 3600 Gas User. The default option is Diesel User. Selection of the diesel option selects a diesel engine controller as the target controller. Selection of 3600 Gas User selects a natural gas engine controller for the 3600 Series Engine.

If the 3600 Gas User option of the Options >>User Profile (menu >>sub-menu) is selected, the Application Builder 102 will enable the user to input data required to produce the control software for a 3600 natural gas engine controller. The target engine controller's specifications are input via the Program menu on the Pull Down Menu Bar 204 on the Main Screen of Application Builder 102. For the natural gas engine, the specifications are separated into five (5) categories: Air Features, Fuel Features, Timing Features, Engine Core Features, and Protection Features. Entry of the features is accomplished through corresponding options under the Build Menu of the Main Screen 202.

The air features include maps which control the air flow into the engine. The fuel features control fuel flow into the engine. The timing features control the engine's timing. The engine core features define application specific items, e.g., actuator types. The protection features define the protection features which are to be included for the target controller.

In an exemplary embodiment of the natural gas engine controller, the available specifications which can be input by the user are listed in the table of FIG. 18. The individual maps and parameters are explained below.

1. Air Features

In the preferred embodiment, the Air Features includes a number of parameters and maps which control air flow into the engine 106.

With reference to FIG. 19, a Wastegate Parameters Window 1902 allows entry/modification of three parameters for the waste gate actuator 1630. In the preferred embodiment, the three parameters are gain, stability and compensation. The Wastegate Parameters Window 1902 also allows the entry of offsets for each of the parameters.

With reference to FIG. 20, a Volumetric Efficiency Map Window 2002 allows entry/modification of a Volumetric Efficiency Map. The Volumetric Efficiency Map defines how much air is burned in the cylinders of the target engine 106.

With reference to FIG. 21, a Choke Map Window 2102 allows entry/modification of a Choke Map. The Choke Map is used to position the engine's choke plate.

With reference to FIG. 22, a Combustion Probe Map Window 2202 allows entry/modification of a Combustion Probe Map. The Combustion Probe Map instructs the engine controller 104 how to control the air to fuel ratio based on signals from a combustion probe (not shown) within a cylinder. The Combustion Probe measures the burn time within the cylinder.

With reference to FIG. 23, an Air/Fuel Map Window 2302 allows entry/modification of an Air/Fuel Map. The Air/Fuel Map controls the base air to fuel ratio for the engine 106.

2. Fuel Features

In the preferred embodiment, the Fuel Features includes a number of parameters and maps which control fuel flow into the engine 106.

With reference to FIG. 24, an Governor Parameters Window 2402 allows entry/modification of a number of governor parameters. As shown, in the preferred embodiment, the parameters include a Gain, a Stability Factor, and Online Compensation. The Governor Parameters Window 2402 also allows the entry of offsets for each of the parameters.

The Fuel Features also include a number of parameters which are used to configure the engine's fuel parameters for varying ranges of fuel quality. In the preferred embodiment, the parameters include feedback points, BTU setting, and fuel factors.

With reference to FIG. 25, a Feedback Points Window 2502 allows entry/modification of a Feedback Loadpoint and a Feedback Speed Point. Preferably, entry of the two points is accomplished via sliders.

With reference to FIG. 26, a BTU Settings Windows 2602 allows entry/modification of a Minimum BTU Setting, a Maximum BTU Setting, and a Typical BTU Setting. Preferably, entry of the three settings is accomplished via sliders.

With reference to FIG. 27, a Fuel Factors Window 2702 allows entry/modification of a Law Factor Warning and a High Factor Warning. Preferably, entry of the two warnings is accomplished via sliders.

The Fuel Features also includes three maps: a Transient Air/Fuel Map, a Torque Limit Map, and an Idle Fuel Map.

With reference to FIG. 28, a Transient Air/Fuel Map Window 2802 allows entry/modification of the Transient Air/Fuel Map. The Transient Air/Fuel Map tells the engine controller how rich the engine is allowed to run, i.e., the rich limit during loading of the engine (load acceptance).

With reference to FIG. 29, a Torque Limit Map Window 2902 allows entry/modification of the Torque Limit Map. The Torque Limit Map defines maximum fuel for the engine power rating.

With reference to FIG. 30, an Idle Fuel Map Window 3002 allows entry/modification of the Idle Fuel Map. The Idle Fuel Map defines no-load fuel flow.

3. Timing Features

In the preferred embodiment, the Timing Features includes a number of parameters and maps which control the timing of the engine 106.

With reference to FIG. 31, a Timing Retard Map Window 3102 allows entry/modification of a Timing Retard Map.

With reference to FIG. 32, a Steady State (Base) Timing Parameters Window 3202 allows entry of the location of a crank angle sensor measured in degrees from top dead center (TDC).

Figure 33:
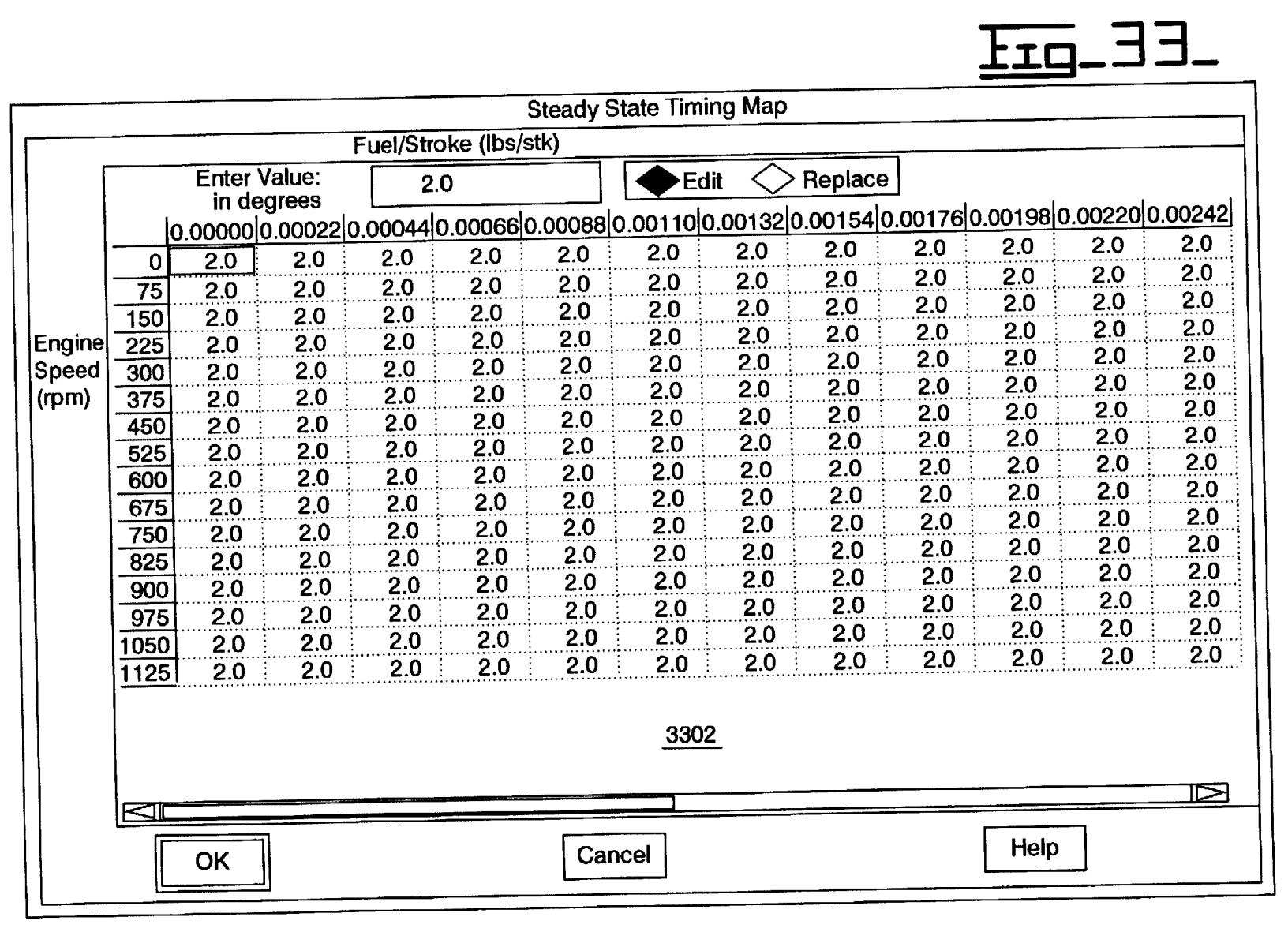

With reference to FIG. 33, a Steady State Timing Map Window 3302 allows entry/modification of the Steady State Timing Map. The Steady State Timing Map defines the engine's base or steady state timing.

4. Engine Core Features

In the preferred embodiment, the Engine Core Features includes a number of parameters which define application specific items.

With reference to FIG. 34, an Engine Core Features Window 3402 allows entry/modification of the engine core features. In the preferred embodiment, the Engine Core Features Window 3402 includes a Desired Speed Scaling Radio Box 3404 for specifying the desired speed scaling, an Electric Starters Radio Box 3406 for specifying whether the target controller includes electric starters, and a Landfill Module Radio Box 3408 for specifying whether the target controller is to include a Landfill Module. Two other Radio Boxes are used to define a pressure module (as Standard or High) and the type of actuator used for choke, wastegate and governor control. Additionally, the Engine Core Features Window 3402 allows definition of a number of constants.

5. Protection Features

In the preferred embodiment, the Protection Features includes a number of parameters for which alarm and shutdown indicator values can be defined. Additionally, includes a number of miscellaneous parameters. In the preferred embodiment, alarm and shutdown values are definable for the following parameters: air temperature, air restriction, crankcase pressure, differential air pressure, battery voltage, jacket water temperature. With reference to FIG. 35, a Protection Features Window 3502 includes a plurality of pushbuttons corresponding to each of the parameters listed above. Activation of a pushbutton results in the display of a corresponding window as described below.

With reference to FIG. 36, an Air Temperature Parameters Window 3602 is displayed upon activation of an air temperature button 3504. The Air Temperature Window 3602 includes three sliders 3602,3604,3606 for setting a shutdown temperature when the engine 104 is at less than 50% load, a caution temperature when the engine is at greater than 50% load, and a shutdown temperature when the engine is at greater than 50% load, respectively.

With reference to FIG. 37, an Air Restriction Window 3702 is displayed upon activation of an air restriction button 3506. The Air Restriction Window 3702 includes four toggle buttons 3704,3706,3708,3710 and corresponding sliders 3712,3714,3716,3718 for enabling and setting a left air restriction caution, a left air restriction shutdown, a right air restriction caution, and a right air restriction shutdown, respectively.

With reference to FIG. 38, a Crankcase Pressure Window 3802 is displayed upon activation of a crankcase pressure button 3508. The Crankcase Pressure Window 3802 includes two buttons 3804,3806 and corresponding sliders 3808,3810 for enabling and setting a crankcase caution pressure and a crankcase shutdown pressure, respectively.

With reference to FIG. 39, a Differential Oil Pressure Window 3902 is displayed upon activation of a differential oil pressure button 3510. The Differential Oil Pressure Window 3902 includes two buttons 3904,3906 and corresponding sliders 3908,3910 for enabling and setting a differential oil caution pressure and a differential oil shutdown pressure, respectively.

With reference to FIG. 40, a Battery Voltage Window 4002 is displayed upon activation of a battery voltage button 3512. The Battery Voltage Window 4002 includes two buttons 4004,4006 and corresponding sliders 4008,4010 for enabling and setting a battery caution voltage and a battery shutdown voltage, respectively.

Figure 41:
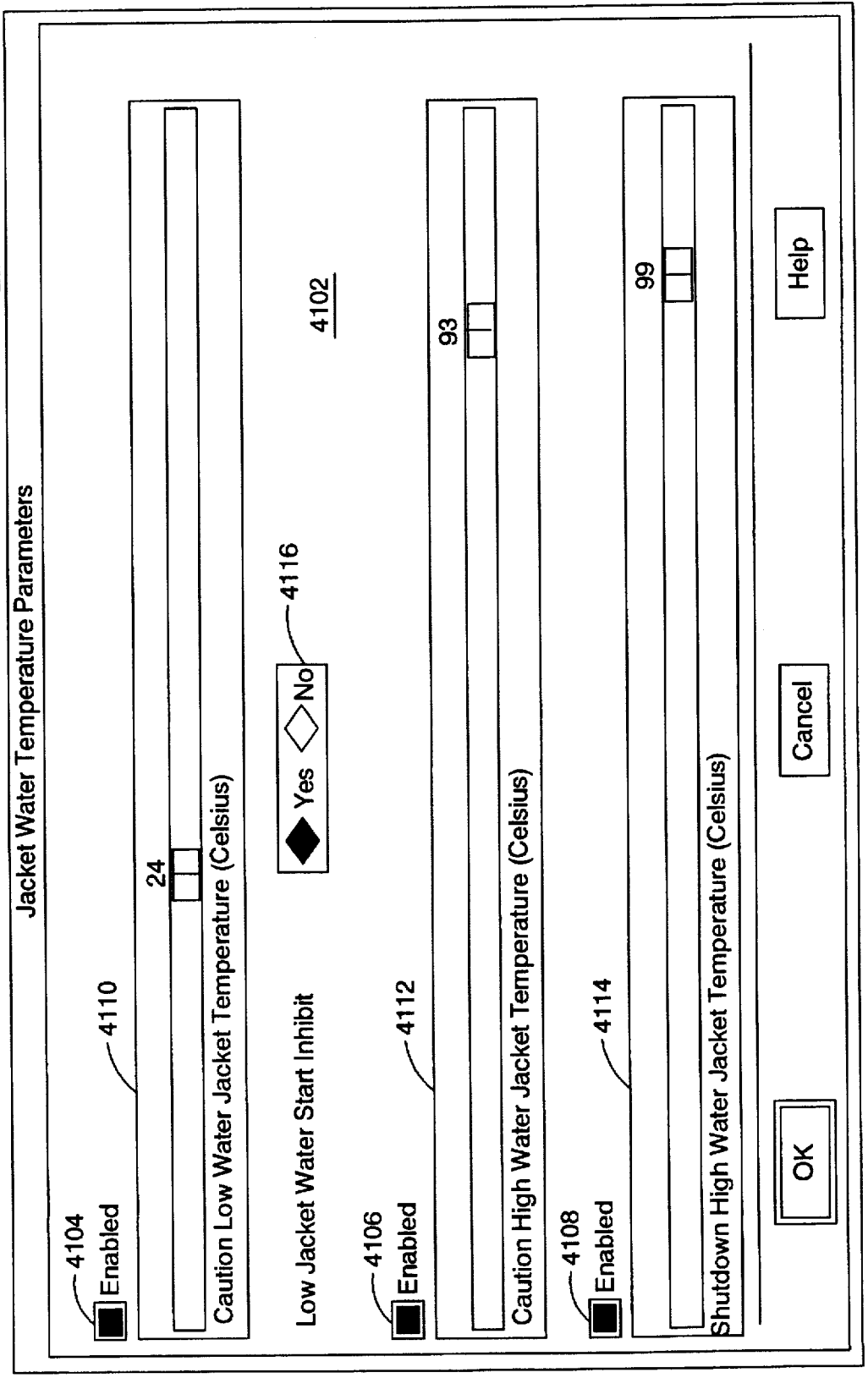
FIG. 41 is a diagrammatic view of a Jacket Water Temperature Window.

With reference to FIG. 41, a Jacket Water Temperature Window 4102 is displayed upon activation of a jacket water temperature button 3514. The Jacket Water Temperature Window 4102 includes three buttons 4104,4106,4108 and corresponding sliders 4110,4112,4114 for enabling and setting a caution low jacket water temperature, a caution high jacket water temperature, and a shutdown high jacket water temperature, respectively.

Additionally, a radio box 4116 enables a low jacket water start inhibit function.

With reference to FIG. 42, a Miscellaneous Protection Parameters Window 4202 allows a number of miscellaneous protection parameters to be defined and/or enabled.

F. Building a Module

After the user has input the target controller's specifications, the Application Builder 102 creates a top level source file for the control software. This is known as building a module. With reference to FIG. 43, a Module Build Menu Screen 4302 is displayed when the user selects the Build option from the main menu. The Module Build Menu Screen 4302 has five (5) main options: Module Identification, Module Parameters, Module Checkoff, View Module Selections, and Assemble Module. Each option is accessed via respective pushbuttons 4304,4306,4308,4310, 4312.

With reference to FIG. 44, when the Module Identification Pushbutton 4304 is actuated, a Module Identification Window 4402 is displayed. The Module Identification Window 4402 includes several text entry fields which are used primarily in the move to production process (see PART VI.G.). A Personality Part Number text field 4404 is used to identify the particular module being compiled. A Developer Name text field 4406 is used to identify the user. Additionally, a text box 4408 allows entry of a change level (see Part VI.G.).

With reference to FIG. 45, a Module Parameters Window 4502 is displayed when the user selects the Module Parameters Pushbutton 4306 from the Module Build Menu 4302. The Module Parameters Window 4502 is used to define the current application for the target controller software. It allows an the number of cylinders of the target engine, the Development Level, e.g., Experimental, a hardware change level, a software change level and the engine application type to be set.

With reference to FIG. 46, if the Module Checkoff Pushbutton 4308 is activated, a Checkoff Submenu 4602 is displayed. The Submenu 4602 displays a list of the available features.

Selection of one of the features under the submenu displays a Checkoff menu. For example with reference to FIG. 47, if Air Features is chosen from the submenu 2208 an Air Features Checkoff Menu 4702 is displayed. The Air Features Checkoff Menu 2402 includes a list of the Air Features and corresponding toggle buttons 4704. Those features that have been previously defined are enabled and the location of the file containing the data (constants and/or maps) are displayed. From this menu, additional features can be enabled or disabled.

With reference to FIG. 48, when the user selects the View Module button 4310 a View Module Window 4802 is displayed. The View Module Window 4802 displays a list of enabled features.

When the user selects the Assemble Module Pushbutton 4312, the Application Builder 102 begins the assembly process. During the assembly process, maps, constants, and other data, i.e., the specifications of the target controller, are compiled into code for the target microprocessor. The compiled code is known as machine code.

G. Moving to Production

Figure 49:
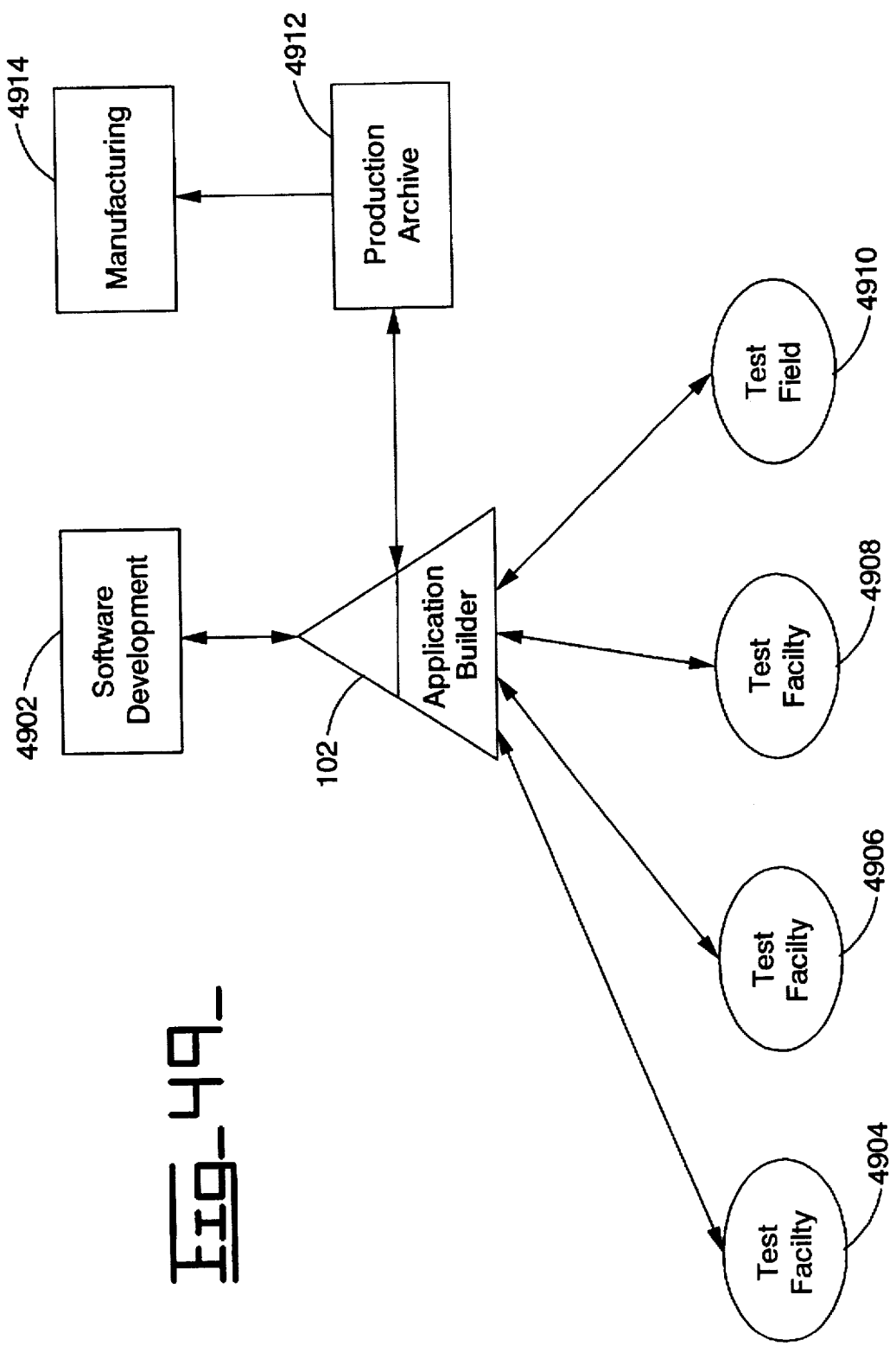
FIG. 49 is a diagrammatic view of Application Builder access.

The Application Builder 102 may be utilized by various users at different locations. Different users may be given different levels of authorization. For example with reference to FIG. 49, engine designs may be tested by software engineers at one location 4902. Engine designs may also be tested at three different test locations: Test Facility 4902, Test Facility 4904, and Test Facility 4906. Additionally, engine designs may be tested from field sights. Users at these different locations may have different authorization. That is, different users may have authorization to modify all or various subsets of the target controller's specifications.

A move to production enables Application Builder 102 to have special authorization to store specification (data) files and production software in a production archive 4912. A production archive 4912 is a protected subdirectory on a particular workstation. Files located on the production archive cannot be modified. There may be more than one production archive. In one embodiment, both the specification files and the production software are stored in a production archive. In another embodiment, the specification files are stored in a separate protected archive.

The data files and control software stored in the production archive 4912 serve three main purposes. First, files in the archive cannot be modified or deleted. Thus, the archive serve as long term storage for production level software. Second, the Production Archive 4912 is accessible at the manufacturing level 4914. Control software for a specific application can be downloaded directly from the Production Archive 4912. This ensures not only the integrity of the control software, but also that the most current version is utilized. And third, the control software and data can be downloaded by other users and used as a baseline for additional variations and modifications to be tested.

The move to production process also sends an automatic electronic mail message to a set of predefined persons as a notification that a module has been saved to the Production Archive 4912. For example, once the Application Builder 102 has stored control software and/or specifications in the production archive 4912, Application Builder 102 automatically sends an electronic mail message to software development engineers 4902.

The Production Archive 4914 is accessed using the Production Menu located on the Pull Down Menu Bar 302 on the Main Screen of Application Builder 304. With reference to FIG. 50, the Production Menu 5002 includes four options: Move to Production, Copy from Production, Print Production Module, and Print Production Module TOC (Table of Contents). The latter three options provide read only access to the Production Archive 4914.

If the Move to Production option is chosen, three checks are completed. First, the accessibility of all referenced data files is confirmed. Second, certain features are required. The required features may change for different applications. A set of required features is known as a minimum set of production requirements. Third, the module and data are checked for specific dependencies.

With reference to FIG. 51, the entire process is generally described. In a first control block 5102, the specifications of the target controller are defined by the user. In a second control block 5104, the control software is produced based on the input specifications. In a decision block 5106, if the Move to Production option has been chosen, the process proceeds to a third control block 5108. In the third control block 5108, the user is prompted for a production name, or a part number. Then in a fifth control block 5110, the control software is stored in the production archive using the assigned production name or part number.

With reference to FIG. 52, the a second embodiment of the process is generally described. In a fifth control block 5202, the specifications of the target controller are defined by the user. In a sixth control block 5204, the control software is produced based on the input specifications. In a second decision block 5206, if the Move to Production option has been chosen, the process proceeds to a seventh control block 5208. In the seventh control block 5208, the user is prompted for a production archive. In a eighth control block 5210 the user is prompted for a production name or part number. The input production name is checked against existing part numbers stored in the production archive in a ninth control block 5212. If the part number exists, then the user is prompted for a change level. In a tenth control block 5216, the control software is stored in the production archive using the assigned production name (and change level, if appropriate). Lastly, in a eleventh control block 5218, an electronic mail message is automatically sent to a set of predetermined persons.

VII. Industrial Applicability

With reference to the drawings, and in operation, the Application Builder 102 is adapted to produce the software for a target controller 104. The target controller 104 is adapted to control a controller device 106.

A user of the Application Builder 102 need not have any programming experience. The user simply inputs the specifications and parameters of target controller and controlled device using the screens of the Application Builder 102. After this process is completed, the Application Builder 102 assembles the machine code for the particular microprocessor(s) on the target controller 104.

The Application Builder 102 is useful in many different situations. The Application Builder 102 may be used in the design of a new application based on the common platform. The Application Builder 102 may also be used to develop and distribute updates to the code for controllers already in use. Additionally, Application Builder 102 may be used during the manufacture of new machines. Not only does each machine model have different requirements, but each individual machine may have different requirements based on machine options, ultimate work site of the machine, and/or customer preference. The Application Builder allows the software to be run on the target controller 104 to be produced without being skilled in engineering.

Other aspects, objects, advantages and uses of this invention can be obtained from a study of the drawings, disclosure, and appended claims.

We claim:

1. Method of operating a computer to produce control software for an electronic controller for a natural gas engine, the method comprising:
   (1) defining a set of air features of the electronic controller and the natural gas engine as a function of user input;
   (2) defining a set of fuel features of the electronic controller and the natural gas engine as a function of user input;
   (3) defining a set of timing features of the electronic controller and the natural gas engine as a function user input;

(4) defining a set of protection features of the electronic controlled and the natural gas engine as a function of user input, wherein said defining a set of protection features including,
   (i) enabling protection features for at least one parameter,
   (ii) defining a caution value for said at least one parameter, and
   (iii) defining a shutdown value for said at least one parameter; and
(5) producing control software to operate the controller as specified by the user defined features.

2. A method, as set forth in claim 1, including the step of defining a set of engine core features of the electronic controller and the natural gas engine as a function of user input.

3. A method, as set forth in claim 1, wherein said at least one parameter ms air temperature.

4. A method, as set forth in claim 1, wherein said at least one parameter ms air restriction.

5. A method, as set forth in claim 1, wherein said at least one parameter is crankcase pressure.

6. A method, as set forth in claim 1, wherein said at least one parameter is differential oil pressure.

7. A method, as set forth in claim 1, wherein said at least one parameter ms battery voltage.

8. A method, as set forth in claim 1, wherein said at least one parameter is jacket water temperature.

9. A method, as set forth in claim 1, wherein said step of defining a set of protection features further includes the steps of:
   enabling protection features for a set of parameters;
   defining a set of caution values corresponding to said set of parameters; and
   defining a set of shutdown values corresponding to said set of parameters.

10. A method, as set forth in claim 1, wherein said at set of protection features includes air temperature, air restriction, crankcase pressure, differential oil pressure, battery voltage, jacket water temperature.

11. A method, as set forth in claim 1, wherein said air features include wastegate parameters.

12. A method, as set forth in claim 1, wherein said air features include a volumetric efficiency map.

13. A method, as set forth in claim 1, wherein said air features include a choke map.

14. A method, as set forth in claim 1, wherein said air features include a combustion probe map.

15. A method, as set forth in claim 1, wherein said air features include an air/fuel map.

16. A method, as set forth in claim 1, wherein said fuel features includes governor parameters.

17. A method, as set forth in claim 1, wherein said fuel features includes feedback points, a BTU setting, and fuel factors.

18. A method, as set forth in claim 1, wherein said fuel features includes a transient air/fuel map.

19. A method, as set forth in claim 1, wherein said fuel features includes a torque limit map.

20. A method, as set forth in claim 1, wherein said fuel features include an idle fuel map.

21. A method, as set forth in claim 1, wherein said timing features include a timing retard map.

22. A method, as set forth in claim 1, wherein said timing features include steady state timing parameters.

23. A method, as set forth in claim 1, wherein said timing features include a steady state timing map.

24. A method of operating a computer to produce control software for an electronic controller for a natural gas engine, the method comprising:
   (1) defining a set of air features of the electronic controller and the natural gas engine as a function of user input;
   (2) defining a set of fuel features of the electronic controller and the natural gas engine as a function of user input;
   (3) defining a set of timing features of the electronic controller and the natural gas engine as a function of user input;
   (4) defining a set of engine core features of the electronic controller and the natural gas engine as a function of user input;
   (5) defining a set of protection features of the electronic controller and the natural gas engine as a function of user input; and,
   (6) defining a set of protection features of the electronic controlled and the natural gas engine as a function of user input, wherein said defining a set of protection features including,
      (i) enabling a set of protection features for a set of parameters,
      (ii) defining a set of caution values for said set of parameters, and
      (iii) defining a set of shutdown values for said set of parameters; and
   (7) producing control software to operate the controller as specified by the user defined features.

* * * * *

UNITED STATES PATENT AND TRADEMARK OFFICE
CERTIFICATE OF CORRECTION

PATENT NO. : 5,724,242
DATED : March 3, 1998
INVENTOR(S) : MOORE-McKEE, ET AL.

It is certified that error appears in the above-identified patent and that said Letters Patent is hereby corrected as shown below:

Column 13, line 18, delete "ms" and insert --is--
Column 13, line 20, delete "ms" and insert --is--

Signed and Sealed this

Twelfth Day of May, 1998

Attest:

BRUCE LEHMAN

Attesting Officer

Commissioner of Patents and Trademarks